(12) United States Patent
Lee et al.

(10) Patent No.: US 11,963,137 B2
(45) Date of Patent: Apr. 16, 2024

(54) METHOD AND APPARATUS FOR PERFORMING BWP-BASED COMMUNICATION IN NR V2X

(71) Applicant: LG Electronics Inc., Seoul (KR)

(72) Inventors: Jongyoul Lee, Seoul (KR); Hanbyul Seo, Seoul (KR); Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 361 days.

(21) Appl. No.: 17/264,733

(22) PCT Filed: Dec. 18, 2019

(86) PCT No.: PCT/KR2019/017997
§ 371 (c)(1),
(2) Date: Jan. 29, 2021

(87) PCT Pub. No.: WO2020/130625
PCT Pub. Date: Jun. 25, 2020

(65) Prior Publication Data
US 2021/0306984 A1    Sep. 30, 2021

(30) Foreign Application Priority Data

Dec. 18, 2018 (KR) .......................... 10-2018-0164569
Dec. 17, 2019 (KR) .......................... 10-2019-0169052

(51) Int. Cl.
*H04W 72/02*    (2009.01)
*H04W 72/0453*    (2023.01)
*H04W 92/18*    (2009.01)

(52) U.S. Cl.
CPC ....... *H04W 72/02* (2013.01); *H04W 72/0453* (2013.01); *H04W 92/18* (2013.01)

(58) Field of Classification Search
CPC . H04W 72/02; H04W 72/0453; H04W 92/18; H04W 84/005; H04W 4/40; H04W 72/569; H04W 72/535
See application file for complete search history.

(56) References Cited

U.S. PATENT DOCUMENTS

| | | |
|---|---|---|
| 2018/0183551 A1 | 6/2018 | Chou et al. |
| 2021/0168814 A1* | 6/2021 | Chen ..................... H04W 72/02 |
| 2021/0274501 A1* | 9/2021 | Kwak ................... H04L 5/0092 |
| 2021/0329597 A1* | 10/2021 | Kwak ..................... H04W 4/40 |
| 2022/0015072 A1* | 1/2022 | Hwang ................. H04W 76/14 |

(Continued)

OTHER PUBLICATIONS

KR Notice of Allowance in Korean Appln. No. 10-2019-0169052, dated Oct. 22, 2020, 4 pages (with English translation).

(Continued)

*Primary Examiner* — Abdullahi Ahmed
(74) *Attorney, Agent, or Firm* — Fish & Richardson P.C.

(57) ABSTRACT

Provided are a method by which a first apparatus configures a bandwidth part (BWP) and an apparatus for supporting same. The method may comprise the steps of: configuring a first BWP related to communication between the first apparatus and a base station; and configuring a second BWP related to sidelink communication between the first apparatus and a second apparatus. Here, numerology of the first BWP and numerology of the second BWP may be the same.

19 Claims, 26 Drawing Sheets

(56) References Cited

U.S. PATENT DOCUMENTS

2022/0070878 A1* 3/2022 Lee ................... H04W 72/0453
2022/0141069 A1* 5/2022 Lee ....................... H04L 5/0098
                                                                370/329
2022/0201661 A1* 6/2022 Hosseini ........... H04W 72/0453

OTHER PUBLICATIONS

LG Electronics, "Frame structure for NR unlicensed operation," R1-1812557, 3GPP TSG RAN WG1 Meeting #95, Spokane, USA, dated Nov. 12-16, 2018, 11 pages.
Huawei, HiSilicon, "Discussion on Uu-based sidelink resource allocation/configuration," R1-1812213, 3GPP TSG RAN WG1 Meeting #95, Spokane, USA, dated Nov. 12-16, 2018, 9 pages.
Huawei, HiSilicon, "On relationship between SL BWP and Uu BWP," R1-1814304, 3GPP TSG RAN WG1 Meeting #95, Spokane, USA, dated Nov. 12-16, 2018, 3 pages.
Huawei, HiSilicon, "Summary of AI: 7.2.4.3 Uu-based sidelink resource allocation/configuration," R1-1814216, 3GPP TSG RAN WG1 Meeting #95, Spokane, USA, dated Nov. 12-16, 2018, 5 pages.
KT Corp., "BWP operation on V2X sidelink," R1-1813497, 3GPP TSG RAN WG1 Meeting #95, Spokane, USA, dated Nov. 12-16, 2018, 3 pages.
OPPO, "Physical layer structure for NR-V2X," R1-1812810, 3GPP TSG RAN WG1 Meeting #95, Spokane, USA, dated Nov. 12-16, 2018, 7 pages.

* cited by examiner (a)

(b)

(a)

(b)

METHOD AND APPARATUS FOR PERFORMING BWP-BASED COMMUNICATION IN NR V2X

CROSS-REFERENCE TO RELATED APPLICATIONS

This application is a National Stage application under 35 U.S.C. § 371 of International Application No. PCT/KR2019/017997, filed on Dec. 18, 2019, which claims the benefit of Korean Patent Applications No. 10-2018-0164569 filed on Dec. 18, 2018, and No. 10-2019-0169052 filed on Dec. 17, 2019. The disclosures of these prior applications are hereby incorporated by reference in their entirety.

BACKGROUND OF THE DISCLOSURE

Field of the Disclosure

The present disclosure related to a wireless communication system.

Related Art

A wireless communication system is a multiple access system that supports communication of multiple users by sharing available system resources (e.g., a bandwidth, transmission power, and so on) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Objects

Meanwhile, with the adoption of a bandwidth part (BWP) to NR SL, switching between Uu BWP and SL BWP and delay (or latency) according to the switching need to be considered. For example, in case the Uu BWP and SL BWP are differently and independently defined/configured for a user equipment (UE), the UE may need to perform switching between the Uu BWP and the SL BWP, and a delay (or latency) corresponding to the Uu BWP switching time may be required in accordance with the switching. Ideally, in order to prevent BWP switching from being required between the Uu BWP and the SL BWP, it may be preferable to regulate or configure, in advance, the Uu BWP and the SL BWP to be in a particular relationship for a UE. However, when considering the capability of each UE and a band combination according to the band resource, BWP switching of the UE may be inevitably required.

Technical Solutions

According to an embodiment, provided herein is a method for configuring a bandwidth part (BWP), by a first apparatus. The method may include the steps of configuring a first BWP related to communication between the first apparatus and a base station, and configuring a second BWP related to sidelink communication between the first apparatus and a second apparatus. Herein, a numerology of the first BWP and a numerology of the second BWP may be the same.

According to another embodiment, provided herein is a method for transmitting, to a first apparatus, information related to a bandwidth part (BWP), by a base station. The method may include the steps of transmitting, to the first apparatus, information related to a first BWP for communication between the first apparatus and the base station, and transmitting, to the first apparatus, information related to a second BWP for communication between the first apparatus and a second apparatus. Herein, a numerology of the first BWP and a numerology of the second BWP may be the same.

According to another embodiment, provided herein is a first apparatus for configuring a bandwidth part (BWP). The first apparatus may include one or more memories, one or more transceivers, and one or more processors connected to the one or more memories and the one or more transceivers. The one or more processors may be configured to configure a first BWP related to communication between the first apparatus and a base station, and to configure a second BWP related to sidelink communication between the first apparatus and a second apparatus. Herein, a numerology of the first BWP and a numerology of the second BWP may be the same.

Effects of the Disclosure

A user equipment (UE) may efficiently perform SL communication and Uu communication.

DESCRIPTION OF EXEMPLARY EMBODIMENTS

In various embodiments of the present disclosure, it shall be interpreted that "/" and "," indicate "and/or". For example, "A/B" may mean "A and/or B". Additionally, "A, B" may also mean "A and/or B". Moreover, "A/B/C" may mean "at least one of A, B and/or C". Furthermore, "A, B, C" may also mean "at least one of A, B and/or C".

In various embodiments of the present disclosure, it shall be interpreted that "or" indicates "and/or". For example, "A or B" may include "only A", "only B", and/or "both A and B". In other words, it shall be interpreted that "or" indicates "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A, which is a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
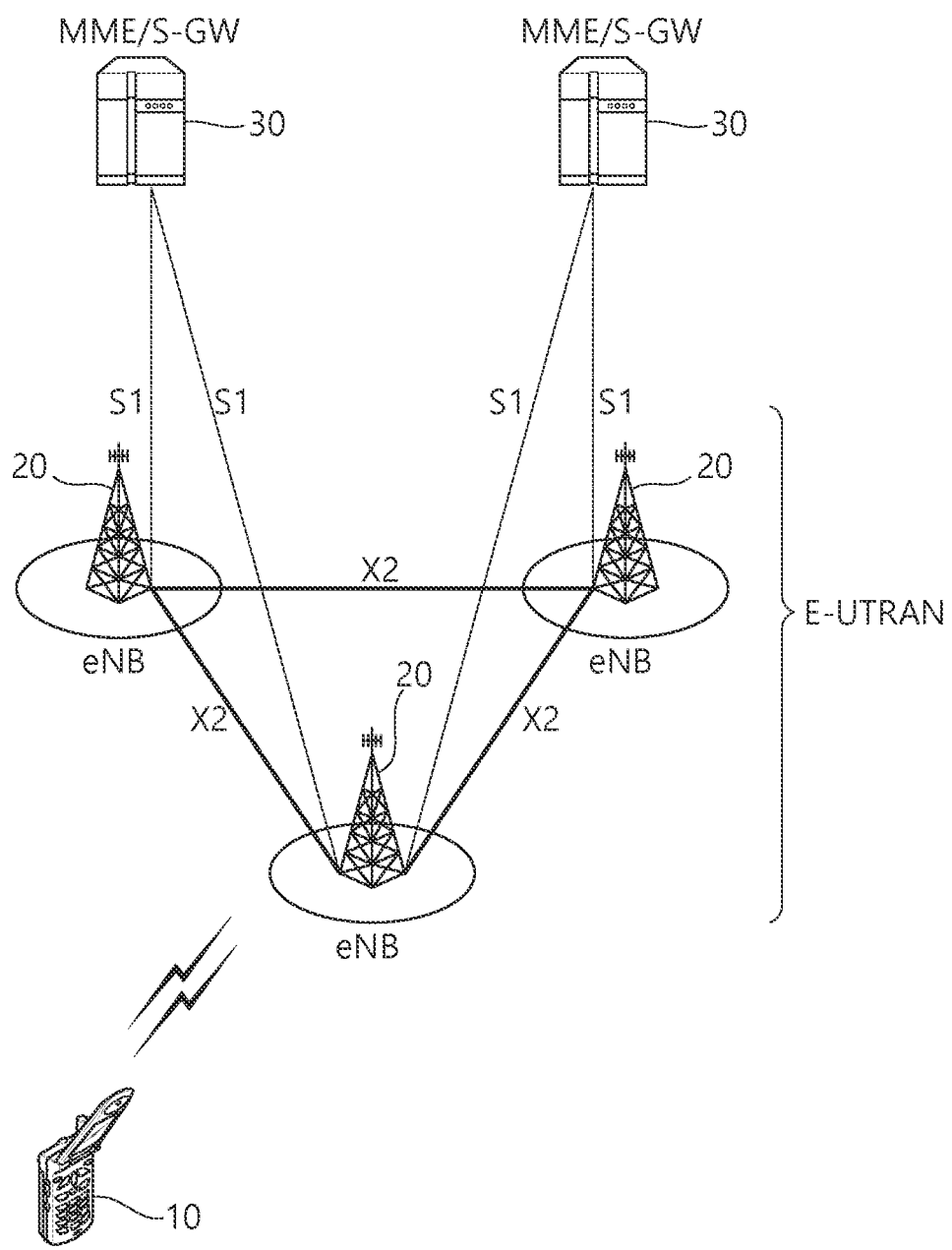
FIG. 1 shows a structure of an LTE system, in accordance with an embodiment of the present disclosure.

FIG. 1 shows a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicates with the UE (10) and may also be referred to by using different terms, such as evolved-NodeB (eNB), Base Transceiver System (BTS), Access Point (AP), and so on.

The base stations (20) are interconnected through an X2 interface. The base stations (20) are connected to an Evolved Packet Core (EPC) (30) through an S1 interface. More specifically, the base station (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
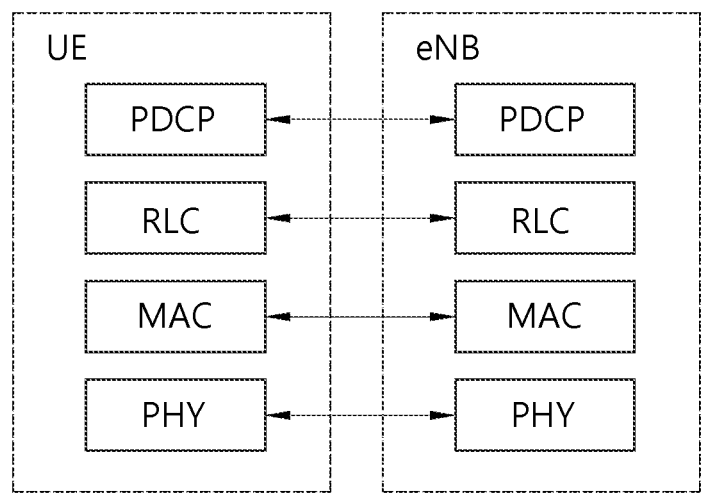
FIG. 2 shows a radio protocol architecture of a user plane, in accordance with an embodiment of the present disclosure.
Figure 3:
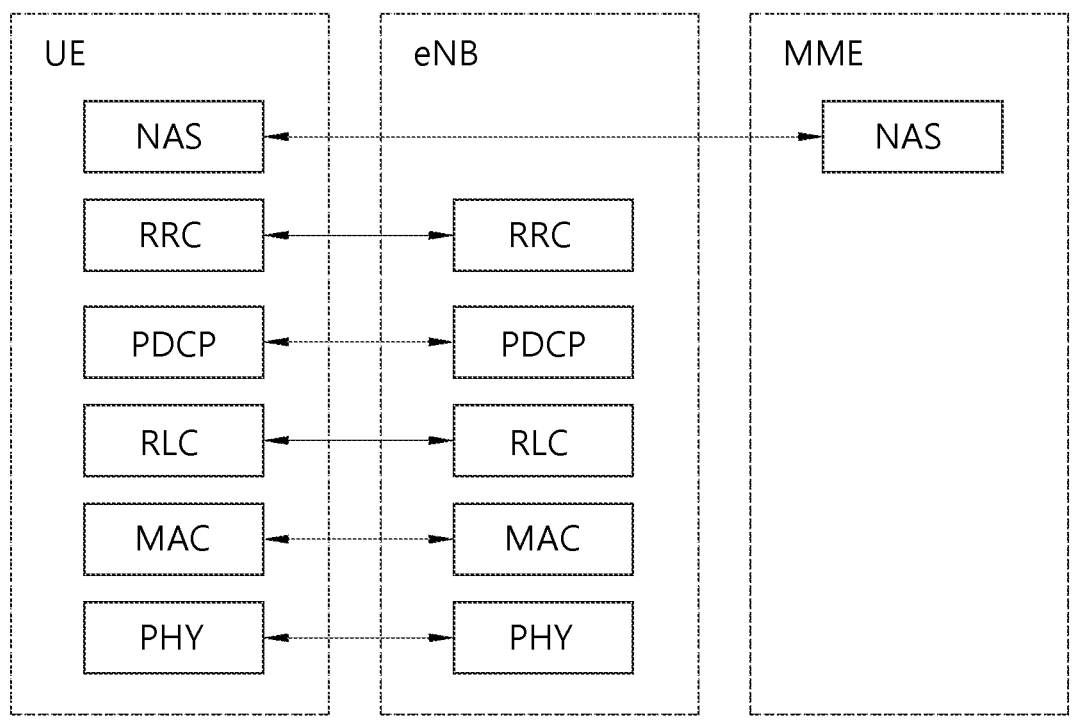
FIG. 3 shows a radio protocol architecture of a control plane, in accordance with an embodiment of the present disclosure.

FIG. 2 shows a radio protocol architecture of a user plane, in accordance with an embodiment of the present disclosure. FIG. 3 shows a radio protocol architecture of a control plane, in accordance with an embodiment of the present disclosure. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
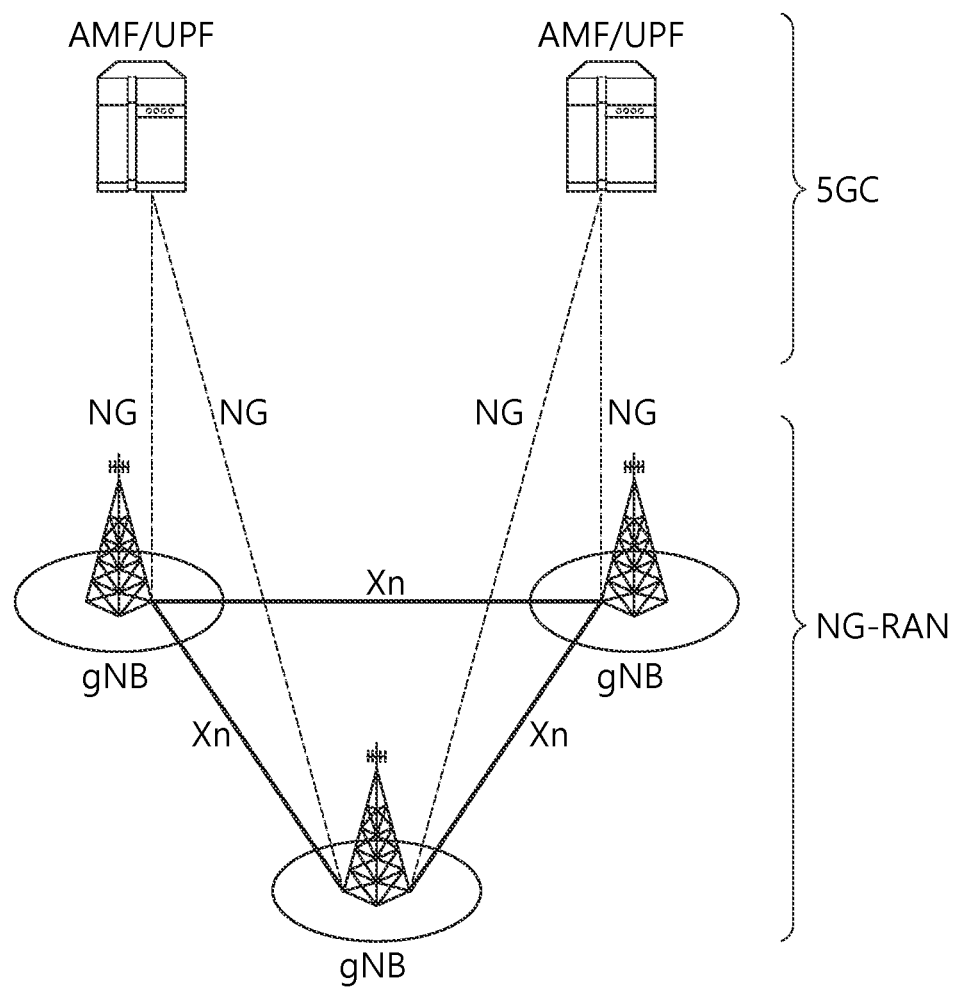
FIG. 4 shows a structure of an NR system, in accordance with an embodiment of the present disclosure.

FIG. 4 shows a structure of an NR system, in accordance with an embodiment of the present disclosure.

Referring to FIG. 4, a Next Generation-Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected via Xn interface. The gNB and the eNB are connected via $5^{th}$ Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
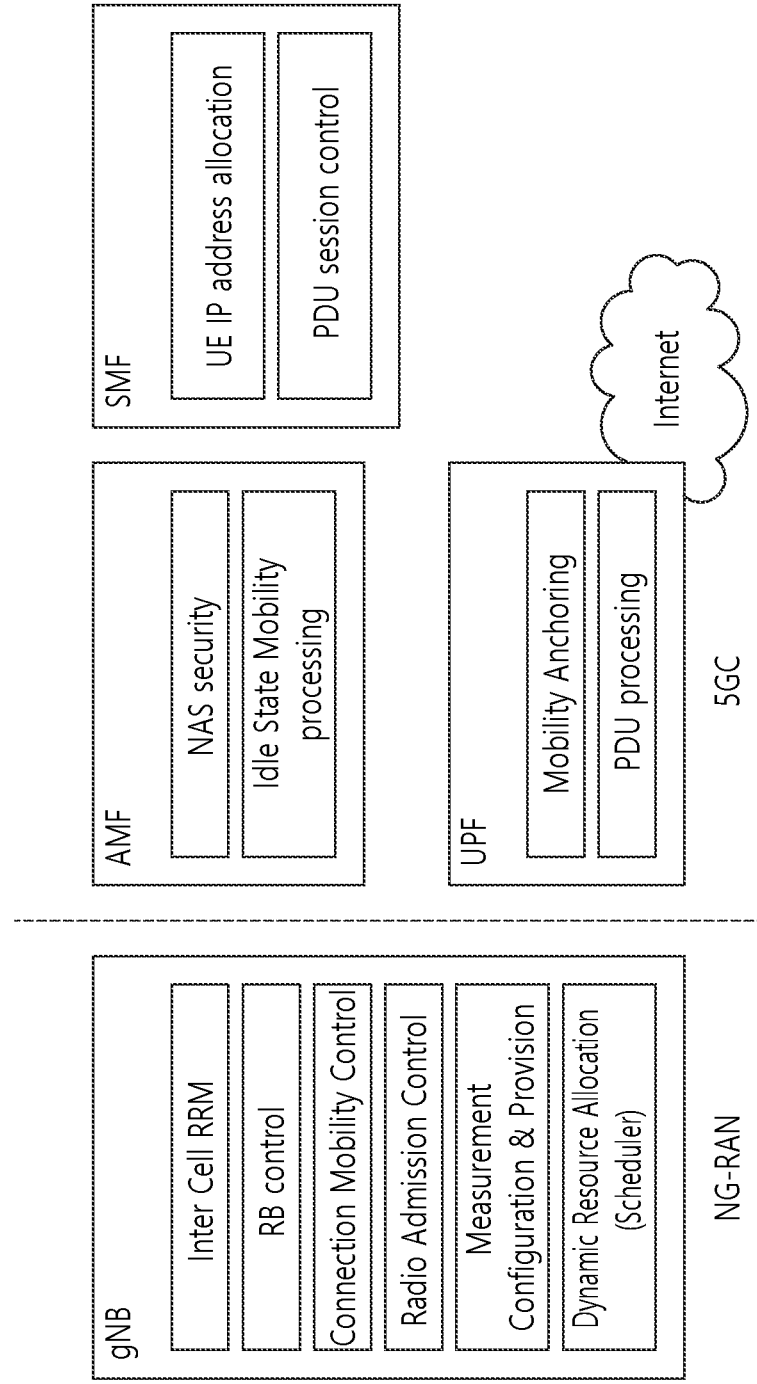
FIG. 5 shows a functional division between an NG-RAN and a 5GC, in accordance with an embodiment of the present disclosure.

FIG. 5 shows a functional division between an NG-RAN and a 5GC, in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
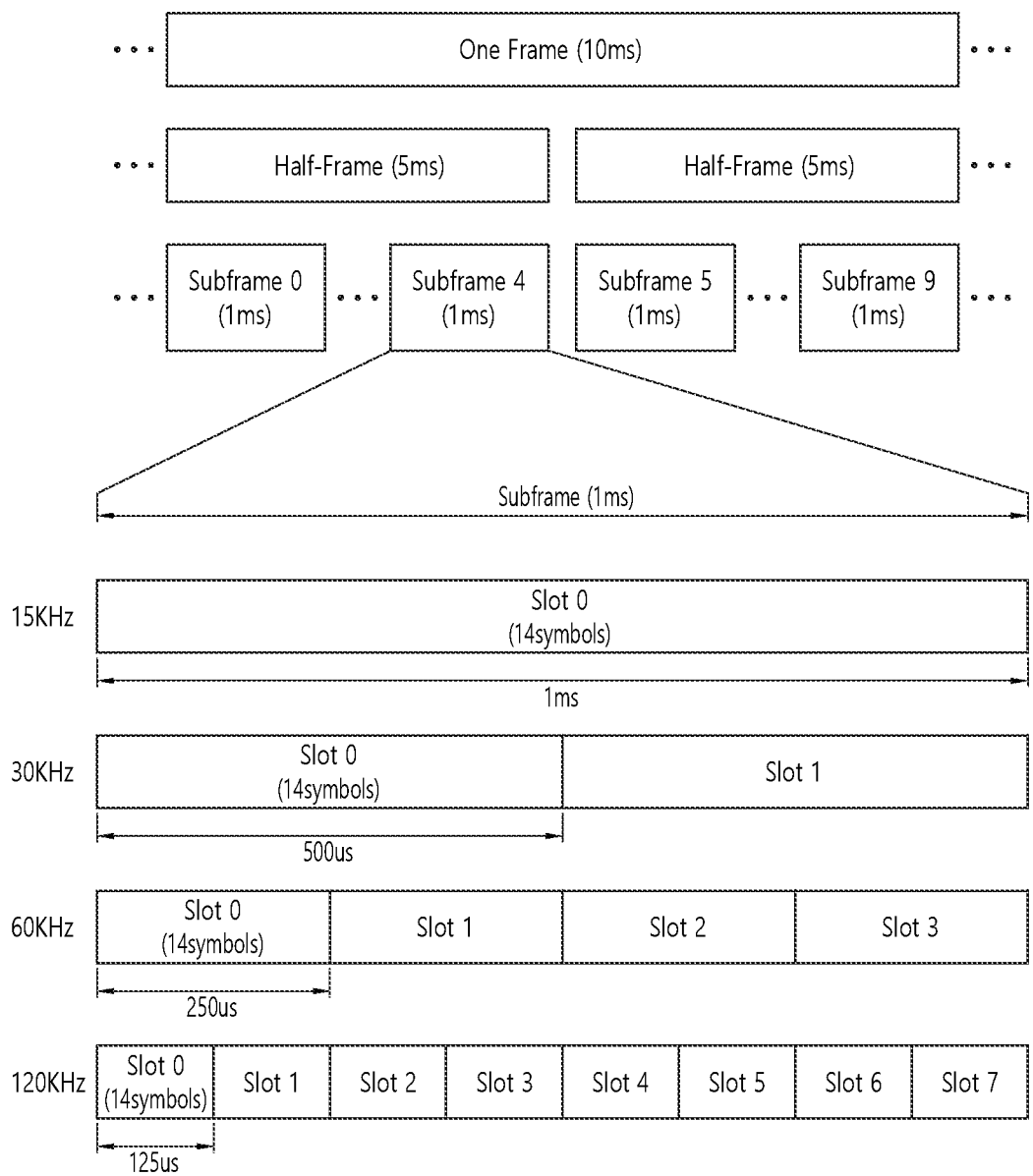
FIG. 6 shows a structure of a radio frame of an NR, in accordance with an embodiment of the present disclosure.

FIG. 6 shows a structure of a radio frame of an NR, in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting various 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHZ | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHZ | 60, 120, 240 kHz |

Figure 7:
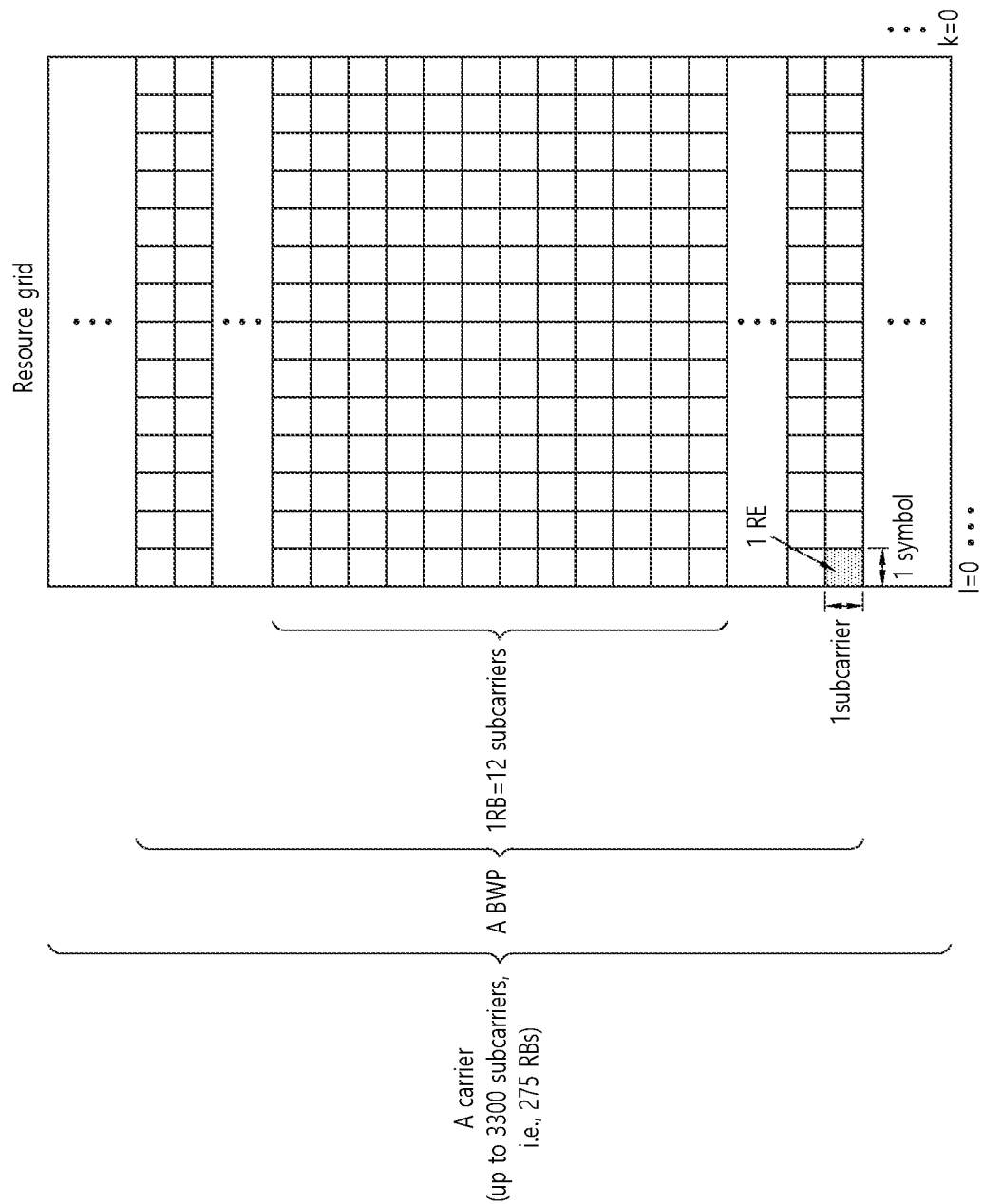
FIG. 7 shows a structure of a slot of an NR frame, in accordance with an embodiment of the present disclosure.

FIG. 7 shows a structure of a slot of an NR frame, in accordance with an embodiment of the present disclosure.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a Bandwidth Part (BWP) and a carrier will be described in detail.

The Bandwidth Part (BWP) may be a continuous set of physical resource blocks (PRBs) within a given numerology. The PRB may be selected from a continuous partial set of a common resource block (CRB) for a given numerology on a given carrier.

When using Bandwidth Adaptation (BA), a receiving bandwidth and a transmitting bandwidth of a user equipment (UE) are not required to be as wide (or large) as the bandwidth of the cell, and the receiving bandwidth and the transmitting bandwidth of the UE may be controlled (or adjusted). For example, the UE may receive information/configuration for bandwidth control (or adjustment) from a network/base station. In this case, the bandwidth control (or adjustment) may be performed based on the received information/configuration. For example, the bandwidth control (or adjustment) may include reduction/expansion of the bandwidth, position change of the bandwidth, or change in subcarrier spacing of the bandwidth.

For example, the bandwidth may be reduced during a duration with little activity in order to save power. For example, a position of the bandwidth may be relocated (or moved) from a frequency domain. For example, the position of the bandwidth may be relocated (or moved) from a frequency domain in order to enhance scheduling flexibility. For example, subcarrier spacing of the bandwidth may be changed. For example, the subcarrier spacing of the bandwidth may be changed in order to authorize different services. A subset of a total cell bandwidth of a cell may be referred to as a Bandwidth Part (BWP). BA may be performed when a base station/network configures BWPs to the UE, and when the base station/network notifies the BWP that is currently in an active state, among the BWPs, to the UE.

For example, the BWP may be one of an active BWP, an initial BWP, and/or a default BWP. For example, the UE may not monitor a downlink radio link quality in a DL BWP other than the active DL BWP within a primary cell (PCell). For example, the UE may not receive a PDCCH, a PDSCH or a CSI-RS (excluding only the RRM) from outside of the active DL BWP. For example, the UE may not trigger a Channel State Information (CSI) report for an inactive DL BWP. For example, the UE may not transmit a PUCCH or a PUSCH from outside of an inactive DL BWP. For example, in case of a downlink, an initial BWP may be given as a continuous RB set for an RMSI CORESET (that is configured by a PBCH). For example, in case of an uplink, an initial BWP may be given by a SIB for a random access procedure. For example, a default BWP may be configured by a higher layer. For example, an initial value of a default BWP may be an initial DL BWP. For energy saving, if the UE fails to detect DCI during a predetermined period of time, the UE may switch the active BWP of the UE to a default BWP.

Meanwhile, a BWP may be defined for the SL. The same SL BWP may be used for transmission and reception. For example, a transmitting UE may transmit an SL channel or SL signal within a specific BWP, and a receiving UE may receive an SL channel or SL signal within the same specific BWP. In a licensed carrier, the SL BWP may be defined separately from a Uu BWP, and the SL BWP may have a separate configuration signaling from the Uu BWP. For example, the UE may receive a configuration for an SL BWP from the base station/network. The SL BWP may be configured (in advance) for an out-of-coverage NR V2X UE and an RRC_IDLE UE. For a UE operating in the RRC_CONNECTED mode, at least one SL BWP may be activated within a carrier.

Figure 8:
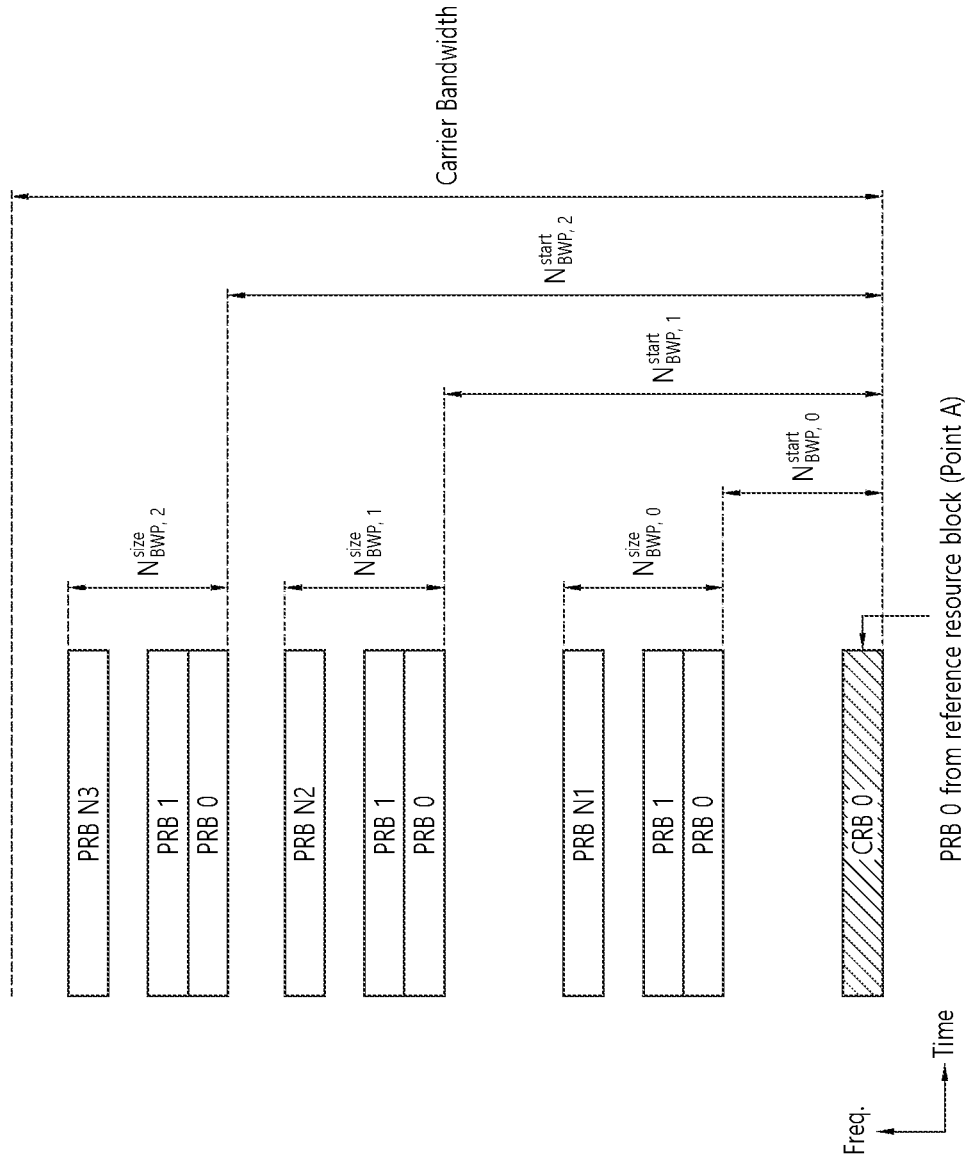
FIG. 8 shows an example of a BWP, in accordance with an embodiment of the present disclosure.

FIG. 8 shows an example of a BWP, in accordance with an embodiment of the present disclosure. In the embodiment of FIG. 8, it is assumed that three BWPs exist.

Referring to FIG. 8, a common resource block (CRB) may be a carrier resource block that is numerated from one end of a carrier band to another end. And, a PRB may be a resource block that is numerated within each BWP. Point A may indicate a common reference point for a resource block grid.

A BWP may be configured by Point A, an offset ($N^{start}_{BWP}$) from Point A, and a bandwidth ($N^{size}_{BWP}$). For example, Point A may be an external reference point of a PRB of a carrier having subcarrier 0 of all numerologies (e.g., all numerologies being supported by the network within the corresponding carrier) aligned therein. For example, the offset may be a PRB distance between a lowest subcarrier within a given numerology and Point A. For example, the bandwidth may be a number of PRBs within the given numerology.

Hereinafter, V2X or SL communication will be described.

Figure 9:
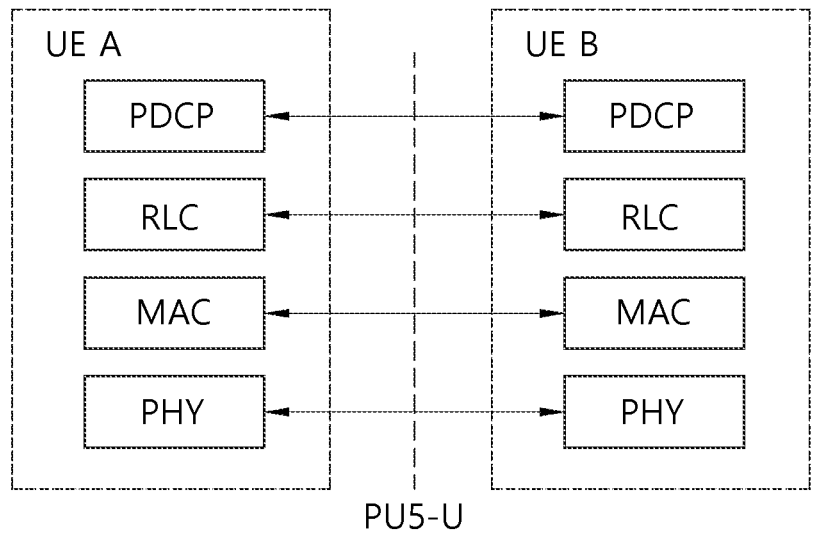
FIG. 9 shows a protocol stack for a SL communication, in accordance with an embodiment of the present disclosure.
Figure 9:
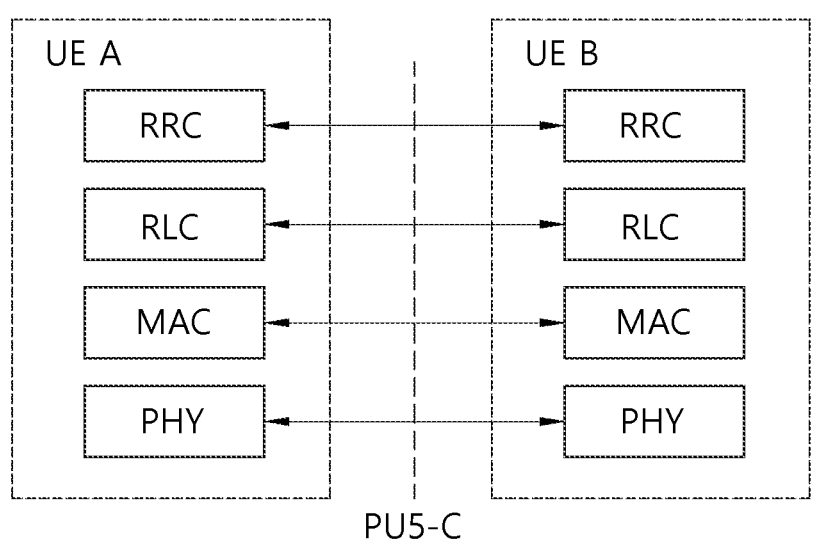

FIG. 9 shows a protocol stack for a SL communication, in accordance with an embodiment of the present disclosure. More specifically, (a) of FIG. 9 shows a user plane protocol stack of LTE, and (b) of FIG. 9 shows a control plane protocol stack of LTE.

Figure 10:
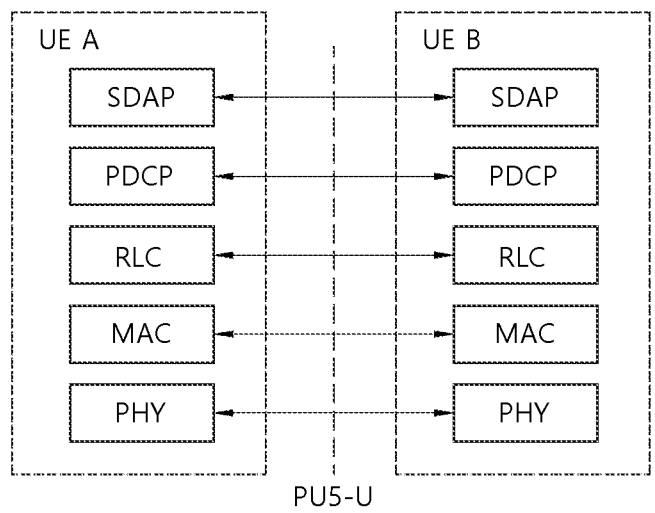
FIG. 10 shows a protocol stack for a SL communication, in accordance with an embodiment of the present disclosure.
Figure 10:
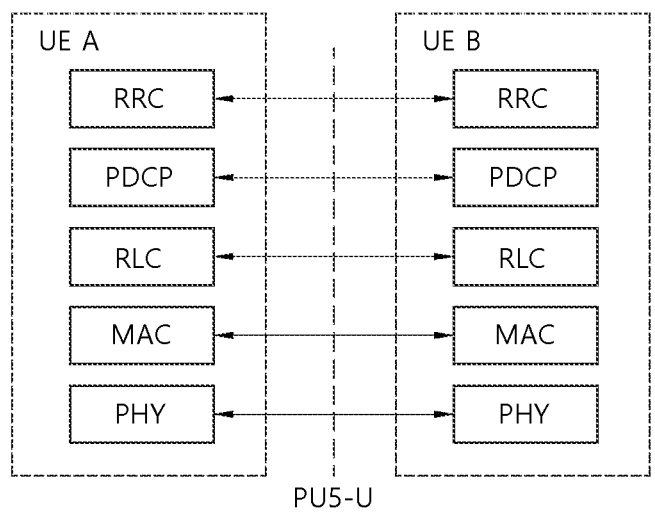

FIG. 10 shows a protocol stack for a SL communication, in accordance with an embodiment of the present disclosure. More specifically, (a) of FIG. 10 shows a user plane protocol stack of NR, and (b) of FIG. 10 shows a control plane protocol stack of NR.

Hereinafter, a sidelink synchronization signal (SLSS) and synchronization information will be described.

The SLSS may be an SL-specific sequence and include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and/or for synchronization acquisition. For example, the UE may use the S-PSS and the S-SSS for acquisition of fine synchronization and/or for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 11:
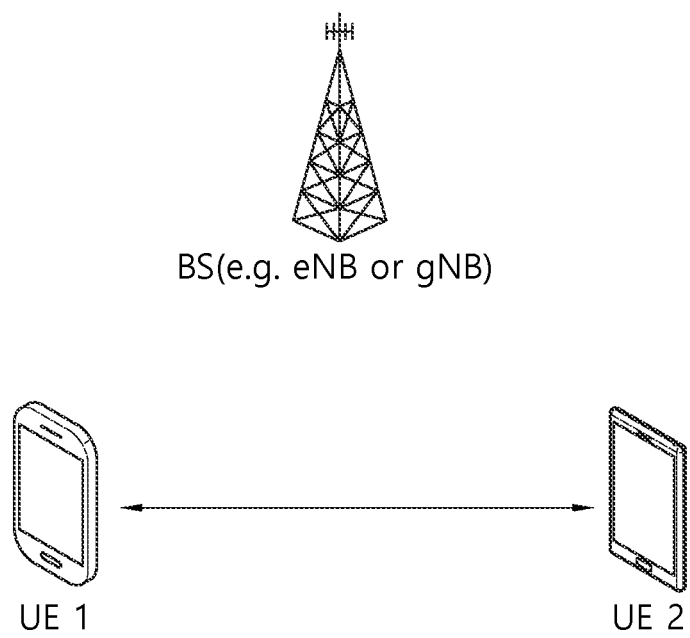
FIG. 11 shows a UE performing V2X or SL communication, in accordance with an embodiment of the present disclosure.

FIG. 11 shows a UE performing V2X or SL communication, in accordance with an embodiment of the present disclosure.

Referring to FIG. 11, in V2X or SL communication, the term 'UE' may generally imply a UE of a user. However, if a network equipment such as a BS transmits/receives a signal based on a communication scheme between UEs, the BS may also be regarded as a sort of the UE. For example, a UE 1 may be a first device (or apparatus) (100), and a UE 2 may be a second device (or apparatus) (200).

For example, the UE 1 may select a resource unit corresponding to a specific resource in a resource pool which implies a set of series of resources. In addition, the UE 1 may transmit an SL signal by using the resource unit. For example, the UE 2 which is a receiving UE may be allocated with a resource pool in which the UE 1 is capable of transmitting a signal, and may detect a signal of the UE 1 in the resource pool.

Herein, if the UE 1 is within a coverage of the BS, the BS may inform the UE 1 of the resource pool. Otherwise, if the UE 1 is out of the coverage of the BS, another UE may inform the UE 1 of the resource pool, or the UE 1 may use a pre-configured resource pool.

In general, the resource pool may be configured based on a plurality of resource units, and each UE may select at least one resource unit for SL signal transmission.

Hereinafter, resource allocation in SL will be described.

Figure 12:
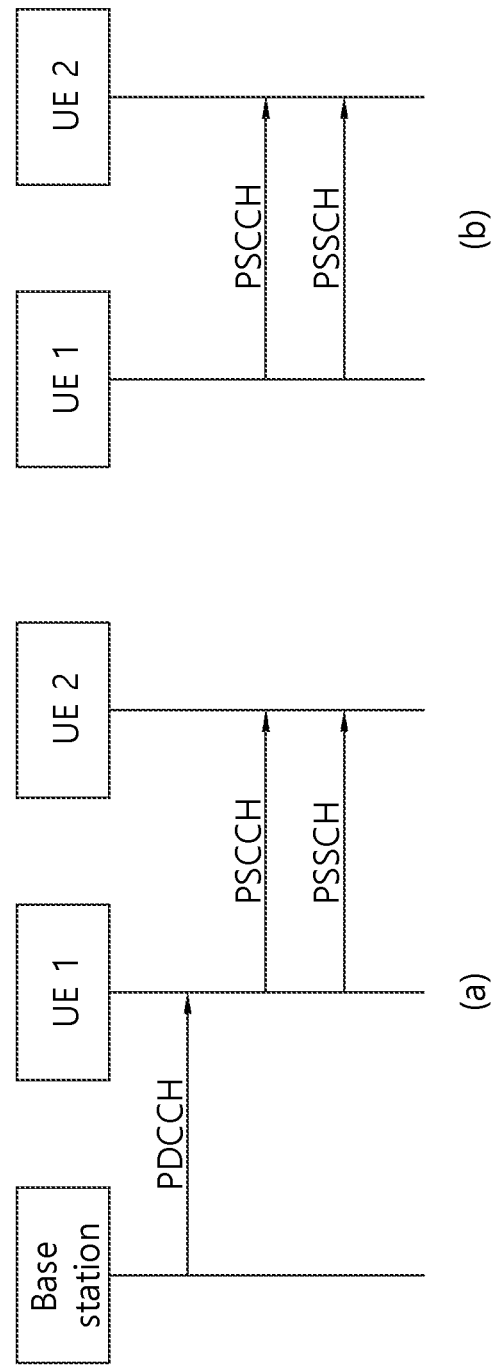
FIG. 12 shows a procedure of performing V2X or SL communication by a UE based on a transmission mode, in accordance with an embodiment of the present disclosure.

FIG. 12 shows a procedure of performing V2X or SL communication by a UE based on a transmission mode, in accordance with an embodiment of the present disclosure. In various embodiments of the present disclosure, the transmission mode may be referred to as a mode or a resource allocation mode. Hereinafter, for convenience of explanation, in LTE, the transmission mode may be referred to as an LTE transmission mode. In NR, the transmission mode may be referred to as an NR resource allocation mode.

For example, (a) of FIG. 12 shows a UE operation related to an LTE transmission mode 1 or an LTE transmission mode 3. Alternatively, for example, (a) of FIG. 12 shows a UE operation related to an NR resource allocation mode 1. For example, the LTE transmission mode 1 may be applied to general SL communication, and the LTE transmission mode 3 may be applied to V2X communication.

For example, (b) of FIG. 12 shows a UE operation related to an LTE transmission mode 2 or an LTE transmission mode 4. Alternatively, for example, (b) of FIG. 12 shows a UE operation related to an NR resource allocation mode 2.

Referring to (a) of FIG. 12, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 based on the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 12, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selection window by performing a sensing and resource (re)selection procedure. For example, the sensing may be performed in unit of sub-channels. In addition, the UE 1 which has autonomously selected the resource within the resource pool may transmit the SCI to the UE 2 through a PSCCH, and thereafter may transmit data based on the SCI to the UE 2 through a PSSCH.

Meanwhile, as described above, in an NR Uu system, a BWP may be defined within a carrier for UL transmission and/or DL reception of a UE. For example, a BWP may be defined as a set of consecutive PRBs within a numerology (e.g., subcarrier spacing). For example, a UE may be configured with a maximum of four BWPs for DL/UL from the base station. Further, for example, a UE may determine an active BWP performing the actual transmission/reception. For example, a UE may determine an active BWP for DL reception, and the UE may determine an active BWP for UL transmission.

For example, in case the UE performs transmission/reception operations through a BWP in the NR system, load may be balanced (or distributed) among other BWPs, and the power of the UE may be saved through Radio Frequency (RF) switching, and multiple cells each having a different capability and supporting various system bandwidths may be supported in a single cell. For example, Table 5 shows an example of BWP switching scenarios.

TABLE 5

| Switching scenarios | Content |
|---|---|
| First scenario | A case where a bandwidth of a BWP is not changed, and a center frequency of the BWP is changed |
| Second scenario | A case where a bandwidth of a BWP is changed, and a center frequency of the BWP is not changed |
| Third scenario | A case where a bandwidth of a BWP is changed, and a center frequency of the BWP is changed |
| Fourth scenario | A case where a bandwidth of a BWP is not changed, a center frequency of the BWP is not changed, and an SCS of the BWP is changed |

Referring to Table 5, for example, in a first scenario, the UE may perform BWP switching that changes a center frequency of a BWP without changing a bandwidth of the BWP. For example, in a second scenario, the UE may perform BWP switching that changes a bandwidth of a BWP without changing a center frequency of the BWP. For example, in a third scenario, the UE may perform BWP switching that changes both center frequency and bandwidth of the BWP. For example, in a fourth scenario, the UE may perform BWP switching that changes an SCS of a BWP without changing the center frequency and bandwidth of the BWP.

Additionally, for example, according to the numerology, a BWP switch delay shown in Table 6 may be required.

TABLE 6

| SCS (15 * $2^u$) | NR Slot length (ms) | BWP switch delay $T_{BWPswitchDelay}$ (slots) | |
| --- | --- | --- | --- |
| | | Type 1[Note 1] | Type 2[Note 1] |
| 15 kHz (u = 0) | 1 | 1 | 3 |
| 30 kHz (u = 1) | 0.5 | 2 | 5 |
| 60 kHz (u = 2) | 0.25 | 3 | 9 |
| 120 kHz (u = 3) | 0.125 | 6 | 17 |

Note [1]Depends on UE capability.
Note 2: If the BWP switch involves changing of SCS, the BWP switch delay is determined by the larger one between the SCS before BWP switch and the SCS after BWP switch.

Referring to Table 6, based on a UE capability related to the BWP switch delay, the UE shall complete BWP switching within a time duration (e.g., $T_{BWPswitchDelay}$). For example, the UE may receive a DCI from the base station, and the UE may switch an active BWP based on the DCI. For example, the UE may receive RRC signaling from the base station, and the UE may switch an active BWP based on the RRC signaling.

Meanwhile, just as in the NR Uu system, a BWP is also defined in NR V2X or NR SL. For example, an SL BWP may be defined independently from a Uu BWP. Furthermore, for example, a resource pool for SL communication (e.g., SL transmission and/or SL reception) may be configured a UE within the SL BWP. In this case, a problem may occur in an interaction between the Uu BWP and the SL BWP.

For example, it will be assumed that an NR V2X UE configures a Uu BWP for its communication with the base station, and that the NR V2X UE performs communication with the base station through the Uu BWP. In this case, in order to (re-)configure an SL BWP so as to allow the NR V2X UE to perform SL transmission, the UE needs to perform a BWP switching operation. In this case, during the process of performing BWP switching by the UE, a BWP switching time may be required. For example, the BWP switching time may vary depending upon the UE implementation. For example, the BWP switching time may include at least one of a time needed by the UE for retuning a local oscillator, a time needed by the UE for reconfiguring an RF chain for a wider (or broader) bandwidth, a time needed by the UE for reconfiguring an RF chain for a narrower bandwidth, and/or a time needed by the UE for reconfiguring an RF chain in order to satisfy a given SCS.

Meanwhile, in NR Uu communication, in case the UE performs BWP switching between a DL BWP and a UL BWP, the UE cannot perform the transmission/reception operations during the corresponding switching time duration (or section). For example, if a UE performing DL reception from the base station through a DL BWP receives a switching command (or instruction) to a UL BWP from the base station, the UE may not be capable of performing the DL reception during the process of performing switching to another UL BWP.

Meanwhile, with the adoption of the SL BWP in NR V2X, the UE may performing switching between a Uu BWP and an SL BWP, and a switching time according to the aforementioned switching may be required. In this case, for example, the UE may not be capable of performing UL transmission, DL reception, SL transmission, and/or SL reception during the switching time duration (or section). That is, due to the switching between the Uu BWP and the SL BWP, an interruption duration (or section) during which the UE cannot perform UL transmission, DL reception, SL transmission, and/or SL reception may occur. Therefore, handling of an interruption duration (or section), which occurs due to the switching between the Uu BWP and the SL BWP, may be needed.

As described above, with the adoption of a BWP in NR SL, a switching between the Uu BWP and the SL BWP and a delay according to the switching may be considered. For example, referring to Table 6, in case the UE uses 15 kHz subcarrier spacing in NR, the BWP switching time may be required as much as a minimum of one slot duration and a maximum of three slot durations. If the Uu BWP and the SL BWP are independently and differently defined/configured by the UE, the UE may need to perform switching between the Uu BWP and the SL BWP, and a delay equivalent to a Uu BWP switching time may be required depending upon the switching. Ideally, in order to prevent BWP switching from being required between the Uu BWP and the SL BWP, it may be preferable to regulate or configure, in advance, the Uu BWP and the SL BWP to be in a particular relationship for a UE. However, when considering the capability of each UE and a band combination according to the band resource, BWP switching of the UE may be inevitably required. This specification proposes a method for allowing all possibilities for BWP switching and for reducing influence caused on Uu communication by the switching between a Uu BWP and an SL BWP and an apparatus for supporting the same.

For example, in case the Uu BWP and the SL BWP are in a particular relationship, the problem of an interruption duration that occurs due to a switching between the Uu BWP and the SL BWP may be resolved. Additionally/alternatively, for example, in case the base station is given authority to control the BWP switching of the UE, the problem of an interruption duration that occurs due to a switching between the Uu BWP and the SL BWP may be resolved. For example, the case where the base station is given authority to control BWP switching of the UE may include a case where the base station is capable of transmitting, to the UE, information related to a time point at which the BWP switching can be performed, and/or a case where the base station is capable of transmitting a BWP switching command to the UE.

Hereinafter, according to the various embodiments of the present disclosure, in order to resolve the problems related to BWP switching delay, a relationship between the Uu BWP and the SL BWP is proposed. Alternatively, for example, under the assumption that the base station is potentially given authority to control the BWP switching of the UE, proposed herein is a method for regulating or controlling in advance, by the base station, a time point of using the Uu BWP and a time point of using the SL BWP.

According to an embodiment of the present disclosure, the base station may control BWP switching of an NR V2X UE. For example, it may be assumed that an NR V2X UE is capable of performing BWP switching between a Uu BWP and an SL BWP, and the base station may have the authority to control the BWP switching of the UE. In this case, in order to reduce the influence caused by the BWP switching on the Uu communication, the base station may control the BWP switching of the UE while considering a BWP switching time of the UE. Herein, for example, a UE performing Uu communication through a Uu BWP may be a UE existing within the coverage of the base station. For example, a UE performing Uu communication through a Uu BWP may be a UE that has established a RRC connection with the base station (i.e., RRC_CONNECTED UE). For example, a UE performing SL communication with an SL BWP may be a UE performing SL communication based on Mode 1. For example, a UE performing SL communication with an SL BWP may be a UE performing SL communication based on Mode 2.

For example, in case a NR V2X UE independently performs BWP switching between the Uu BWP and the SL BWP, the aforementioned interruption duration may occur. Conversely, if the base station is capable of knowing whether or not the UE performs the BWP switching, in order to prevent the interruption duration from causing influence on the Uu communication or SL communication, the base station may transmit, to the UE, information related to the performance or non-performance or parameters related to the BWP switching. For example, if the base station knows whether or not the UE performs the BWP switching, the base station may transmit, to the UE, a BWP switching command and/or BWP switching related parameters while considering the BWP switching delay of the UE. In this case, in order to prevent influence on the Uu communication, the base station may transmit, to the UE, a BWP switching command and/or BWP switching related parameters, which are/is pre-controlled (or pre-adjusted) in advance.

More specifically, for example, the above-described method in which the base station has the authority to control the switching of the BWP, may be limitedly applied only to a scenario where an NR V2X UE performing communication through a single-carrier switches to an SL BWP for SL transmission while performing DL/UL transmission/reception through the Uu BWP. Such limitations are needed for the following reasons. For example, in a scenario where the UE switches from the Uu BWP to the SL BWP, after the UE reports BWP-related operations to the base station through the BWP, which is currently being used by the UE, the UE may perform BWP switching based on a BWP switching command, which is received from the base station. Conversely, for example, in a scenario where the UE switches from the SL BWP to the Uu BWP, in order to report BWP-related operations to the base station, the UE may have to perform unnecessary operations of switching the SL BWP to the Uu BWP in advance. Therefore, the above-described method in which the base station has the authority to control the switching of the BWP, may be limitedly applied only to a scenario where an NR V2X UE performing communication through a single-carrier switches to an SL BWP for SL transmission while performing DL/UL transmission/reception through the Uu BWP.

Alternatively, for example, in case of an NR V2X UE performing communication through a multi-carrier, the problems occurring in the single-carrier may not occur. For example, even in a case where the UE switches from SL BWP to Uu BWP on Component Carrier (CC) #1, the UE may transmit a BWP-related report to the base station on CC #2, and the UE may receive a BWP switching command from the base station on the CC #2. Therefore, an NR V2X UE performing communication through a multi-carrier may perform BWP switching in accordance with the control of the base station in any case.

Figure 13:
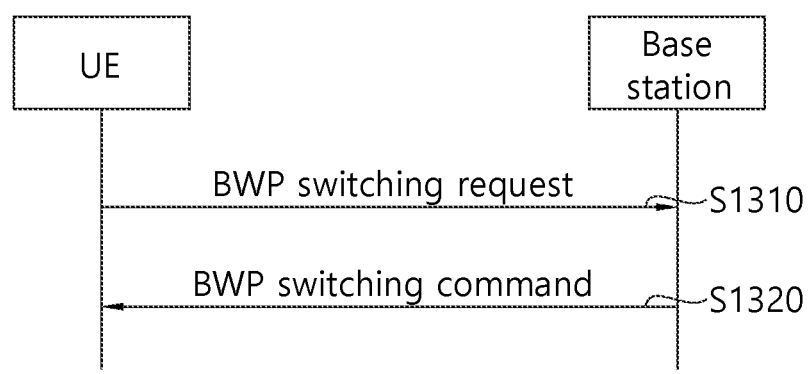
FIG. 13 shows a procedure of performing BWP switching, by a user equipment (UE), based on a command of a base station, in accordance with an embodiment of the present disclosure.

FIG. 13 shows a procedure of performing BWP switching, by a user equipment (UE), based on a command of a base station, in accordance with an embodiment of the present disclosure. The embodiment of FIG. 13 may be combined with other various embodiments of the present disclosure.

Referring to FIG. 13, in step S1310, a UE may transmit a BWP switching request message to a base station. For example, the UE may transmit a BWP switching request message notifying the need for BWP switching to the base station via Uu communication. For example, the UE may transmit a BWP switching request message to the base station and may then notify to the base station that BWP switching from a first BWP to a second BWP is needed. For example, the BWP switching request message may include at least one of information related to the second BWP, UE capability, time remaining in the second BWP, switching delay time needed for the switching from the first BWP to the second BWP, a service type to be transmitted/received by the UE on the second BWP, priority level of the service to be transmitted/received by the UE on the second BWP, delay requirements of the service to be transmitted/received by the UE on the second BWP, and/or reliability requirements of the service to be transmitted/received by the UE on the second BWP. For example, the communication type may include at least one of unicast, multicast, and/or broadcast. For example, the communication type may include at least one of UL communication, DL communication, and/or SL communication.

In step S1320, the base station may transmit a BWP switching command message to the UE. For example, as a response to the BWP switching command message, the base station may transmit a BWP switching command message to the UE. For example, in case the UE receives the BWP switching command message from the base station, the UE may attempt BWP switching.

For example, a BWP switching command message may include at least one of a start time needed for BWP switching, a time offset at which BWP switching starts, and/or a time duration needed for BWP switching. In this case, for example, the base station may notify, to the UE, after how many slots since the time point where the UE has received the BWP switching command message the BWP switching may be performed. For example, the BWP switching command message may include at least one of a time offset needed for a fallback to the old BWP and/or a slot number.

Additionally, the UE having transmitted a BWP switching request message to the base station may determine whether or not a latency (or delay) budget of an SL service, which is to be transmitted by the UE, is tight. In this case, if the UE performs the BWP switching after receiving the BWP switching command message from the base station, the latency (or delay) budget may not be satisfied. Therefore, in this case, the UE having transmitted the BWP switching request message to the base station may immediately attempt/perform BWP switching. For example, after transmitting the BWP switching request message to the base station, the UE may attempt/perform BWP switching regardless of the reception of the BWP switching command message. In this case, the UE may expect that a Uu-related transmission/reception cannot be performed due to the BWP switching request message transmitted to the base station by the corresponding UE. For example, the base station having received the BWP switching request message from the UE may not perform downlink transmission to the UE.

According to an embodiment of the present disclosure, the UE may periodically report its capability to the base station. For example, the UE may periodically report BWP switching related parameters to the base station. For example, the UE may periodically report information related to SL transmission and/or SL reception to the base station.

For example, the BWP switching related parameters may include at least one of each BWP switching time between an SL BWP and multiple configured Uu BWPs, and/or a potential need or no need for BWP switching (e.g., whether or not BWP switching is needed, by the UE, in accordance with the type of packet that is to be transmitted by the UE). For example, the information related to SL transmission and/or SL reception may include at least one of an SL service type, an SL communication type, a priority level of a service that is to be transmitted, reliability requirements of a service that is to be transmitted, and/or resource (reservation/scheduling) information.

For example, if the base station receives the aforementioned information being periodically reported by the UE, in order to avoid conflict between the Uu communication and the SL communication, based on the information reported by the UE, the base station may signal/configure a time duration during which BWP switching is allowed to the UE. For example, in order to avoid conflict between the Uu communication and the SL communication, based on the information reported by the UE, the base station may signal/configure conditions or rules according to which BWP switching is allowed to the UE. Herein, there may exist various methods for signaling, by the base station, a time during which BWP switching is allowed to the UE.

For example, the base station may transmit/configure, to the UE, a duration during which BWP switching is possible in a bitmap format. For example, a bitmap being transmitted to the UE, by the base station, may be information indicating up to which indexed slot from the reception point at which the UE has received the bitmap the UE is capable of performing BWP switching. For example, if the base station transmits a bitmap of '11100' to the UE, the UE may perform BWP switching within a range of up to 3 slots starting from the reception time point of the bitmap. That is, the base station may allow the UE to perform BWP switching during a 3-slot duration starting from a reception time point of the bitmap by the UE.

For example, the base station may notify, to the UE, that BWP switching is allowed starting from a start time of a specific resource during a predetermined number of consecutive slots along a time axis. In this case, the base station may transmit, to the UE, information related to the starting slot and information related to the number of consecutive slots. According to the above-described embodiment, for example, in case the UE periodically reports detailed information to the base station, while the UE performs UL/DL communication through a Uu BWP, and, in case the UE is required to perform switching to an SL BWP for SL transmission, the UE may attempt/perform BWP switching (in accordance with the UE implementation) within a switching allowed time, which is signaled in advance from the base station. For example, the UE may expect zero conflict (or no conflict) between the Uu communication and the SL communication within the allowed time, which is signaled from the base station, and the UE may attempt perform BWP switching within the allowed time.

For example, the base station may notify a transmittable frame considering BWP switching, to the UE, by using another method. For example, in order to perform an appropriate control between the Uu communication and the SL communication, the base station may signal/configure, to the UE, in advance, a bitmap transmittable via Uu transmission and/or a bitmap transmittable via SL transmission while considering a BWP switching time of the UE. For example, the base station may transmit, to the UE, information related to a time point where SL transmission and/or SL reception are/is possible in a UL/DL transmission frame. In this case, the UE having received the aforementioned information may assume or determine that the base station has controlled in advance the conflict between the Uu communication and the SL communication. For example, in case the base station signals/configures, to the UE, a bitmap of '0011100011' for 10 slots within one radio frame, the UE may perform SL transmission in a slot that is related to 1, and the UE may perform UL transmission in a slot that is related to 0. For example, in order to enable the base station to control the conflict between the Uu communication and the SL communication, the UE may report parameters related to BWP switching to the base station.

As described above, the UE may perform switching of the BWP under the control of the base station. Conversely, the UE may report only the information related to its performance or non-performance of BWP switching to the base station or neighboring UE(s) before or after performing the BWP switching, and the UE may attempt/perform BWP switching without any command related to the BWP switching from the base station. According to this method, the UE may have authority on BWP switching.

In various embodiments of the present disclosure, a BWP switching command being controlled/transmitted by the base station or parameters related to BWP switching being transmitted by the base station may be transmitted/signaled to the UE through SIB or RRC message.

As described above, according to the various embodiments of the present disclosure, in case the UE performs switching between a Uu BWP and an SL BWP, in order to reduce influence on the Uu communication, a method for controlling BWP switching of the UE by the base station has been described. Hereinafter, according to the various embodiments of the present disclosure, in order for the BWP switching time to become unnecessary, a correlation between the Uu BWP and the SL BWP will be proposed.

As described above, during a process in which the UE existing within the coverage of the base station (e.g., in-coverage NR V2X UE) performs switching between the Uu BWP and the SL BWP, a delay may occur. For example, the delay may be longer than a delay occurring during a process in which the UE transmits an SL scheduling request (SR) to the base station, receives an SL grant from the base station, and, then, performs the SL transmission. According to an embodiment of the present disclosure, in order to prevent a delay from occurring due to the BWP switching of the UE, a particular relation between the Uu BWP and the SL BWP may be configured or defined, and the UE may perform switching between the Uu BWP and the SL BWP without any BWP switching delay.

Figure 14:
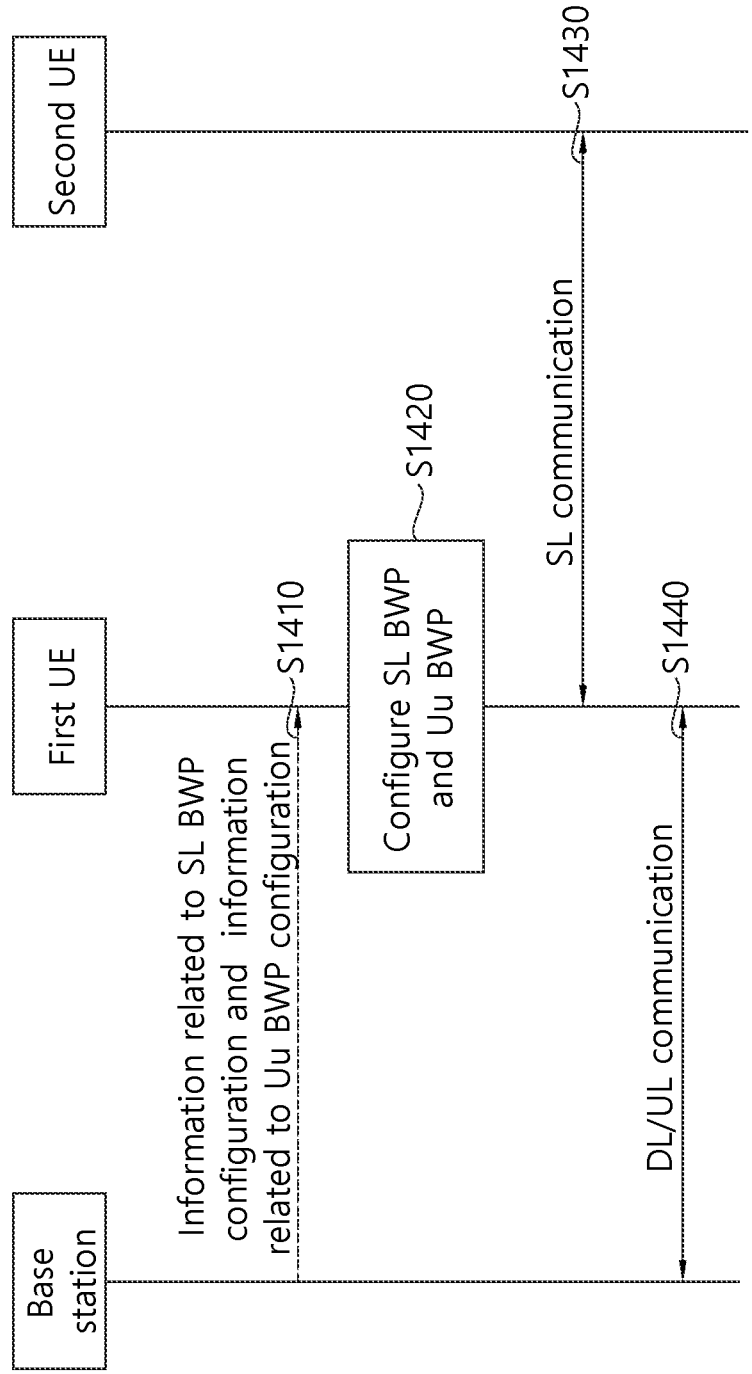
FIG. 14 shows a procedure of performing communication, by a user equipment (UE), by using an SL BWP and a Uu BWP being in a specific relationship with the UE, in accordance with an embodiment of the present disclosure.

FIG. 14 shows a procedure of performing communication, by a user equipment (UE), by using an SL BWP and a Uu BWP being in a specific relationship with the UE, in accordance with an embodiment of the present disclosure. The embodiment of FIG. 14 may be combined with other various embodiments of the present disclosure.

Referring to FIG. 14, in step S1410, a base station may transmit information related to Uu BWP configuration and/or information related to SL BWP configuration to a first UE. Alternatively, the information related to Uu BWP configuration and/or information related to SL BWP configuration may be pre-defined in advance for the first UE. In this case, step S1410 may be omitted.

In step S1420, the first UE may configure an SL BWP and/or a Uu BWP. For example, the first UE may configure an SL BWP and/or a Uu BWP based on the information related to Uu BWP configuration and/or information related to SL BWP configuration, which are/is transmitted from the base station. For example, the first UE may configure an SL BWP and/or a Uu BWP based on the information related to Uu BWP configuration and/or information related to SL BWP configuration, which are/is pre-defined in the system.

For example, in order to reduce BWP switching time, for each of a TX BWP and a RX BWP between the SL BWP and the Uu BWP, BWP related parameters may be equally configured or configured to be partially limited (or restricted). For example, the BWP related parameters may include at least one of a center frequency, a bandwidth size, and/or a numerology.

For example, TX BWP related parameters and RX BWP related parameters of SL may configured to be the same as TX BWP related parameters and RX BWP related parameters of Uu. According to the aforementioned operation, a delay according to BWP switching of the first UE may not occur.

For example, a numerology of SL BWP and a numerology of Uu BWP may be equally configured. For example, the UE may assume or determine that the numerology of active UL BWP and SL BWP are the same within a same carrier during a given time. For example, the UE may not expect the active UL BWP and SL BWP to use different numerologies within the same carrier during a given time. Additionally, for example, a center frequency of SL BWP and a center frequency of Uu BWP may be configured to be the same. For example, a bandwidth of SL BWP may include a bandwidth of Uu BWP. For example, a bandwidth of SL BWP may be included in a bandwidth of Uu BWP. For example, an RF bandwidth for SL of the first UE may be configured to be capable of covering both SL and Uu. For example, an RF bandwidth for Uu of the first UE may be configured to be capable of covering both SL and Uu. In this case, the first UE may perform only a change in an RF chain for a larger bandwidth or smaller bandwidth between the SL and the Uu. And, such operation of the UE does not require any long delay. Therefore, without an actual BWP switching delay, the UE may perform BWP switching.

In step S1430, the first UE may perform SL communication with a second UE by using SL BWP. For example, SL communication may include SL transmission and/or SL reception.

In step S1440, the first UE may perform Uu communication with the base station by using Uu BWP. For example, Uu communication may include UL transmission and/or DL reception.

According to various embodiments of the present disclosure, the base station and the UE may expect conflict between Uu communication and SL communication to be controlled in advance during an interruption duration (or section). For example, the base station may not transmit Uu communication related information/channel (e.g., PBCH information, system information, DCI information, and so on) during the interruption duration (or section). Additionally, for example, the UE may not expect to receive the Uu communication related information/channel during the interruption duration (or section).

Figure 15:
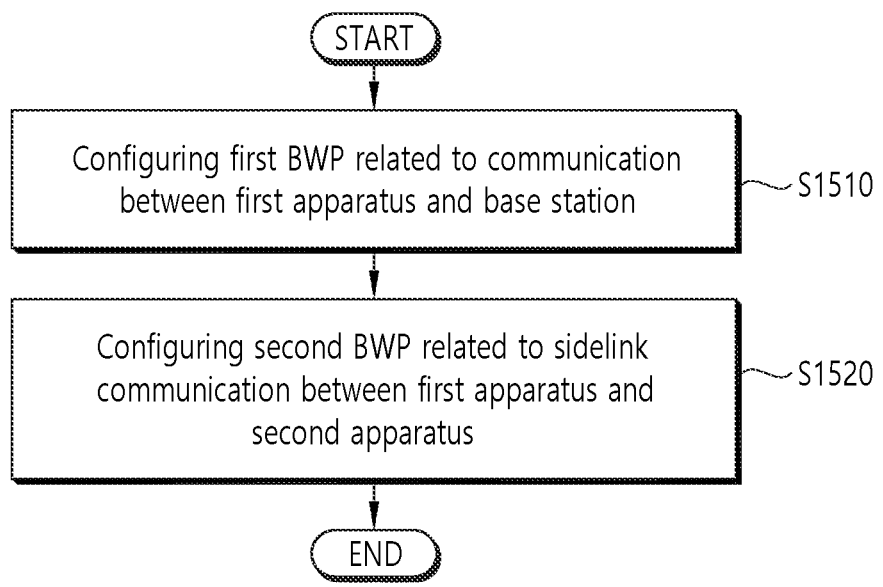
FIG. 15 shows a method for configuring a BWP, by a user equipment (UE), in accordance with an embodiment of the present disclosure.

FIG. 15 shows a method for configuring a BWP, by a user equipment (UE), in accordance with an embodiment of the present disclosure. The embodiment of FIG. 15 may be combined with other various embodiments of the present disclosure.

Referring to FIG. 15, in step S1510, a first apparatus may configure a first BWP being related to a communication between the first apparatus and a base station. For example, the first BWP may be a BWP that is used for performing uplink transmission to the base station.

In step S1520, the first apparatus may configure a second BWP being related to a sidelink communication between the first apparatus and the second apparatus.

For example, a numerology of the first BWP and a numerology of the second BWP may be the same. For example, a numerology may include at least one of subcarrier spacing and cyclic prefix (CP). For example, the subcarrier spacing may include at least one of 15 kHz, 30 kHz, 60 kHz, 120 kHz, or 240 kHz. For example, the CP may be one of a normal cyclic prefix (CP) or an extended cyclic prefix (CP).

For example, a center frequency of the first BWP and a center frequency of the second BWP may be the same. For example, the first BWP may be included in the second BWP. For example, the first BWP and the second BWP may be the same.

For example, the first apparatus may receive information related to the configuration of the first BWP from the base station. Herein, the information related to the configuration of the first BWP may include at least one of a center frequency of the first BWP, a numerology of the first BWP, or a size of the first BWP. For example, the first apparatus may receive information related to the configuration of the second BWP from the base station. Herein, the information related to the configuration of the second BWP may include at least one of a center frequency of the second BWP, a numerology of the second BWP, or a size of the second BWP.

For example, the information related to the first BWP may be pre-defined in advance for the first apparatus. For example, the information related to the second BWP may be pre-defined in advance for the first apparatus.

For example, the first apparatus may perform uplink transmission to the base station through the first BWP. For example, the first apparatus may perform sidelink transmission to the second apparatus through the second BWP.

Figure 16:
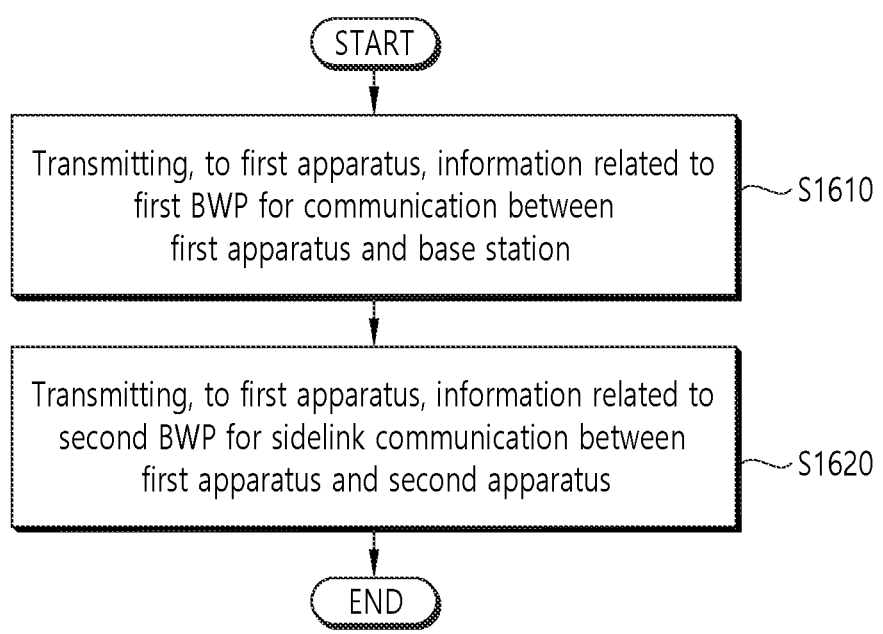
FIG. 16 shows a method for configuring a BWP, by a base station, in accordance with an embodiment of the present disclosure.

FIG. 16 shows a method for configuring a BWP, by a base station, in accordance with an embodiment of the present disclosure. The embodiment of FIG. 16 may be combined with other various embodiments of the present disclosure.

Referring to FIG. 16, in step S1610, a base station may transmit, to a first apparatus, information related to a first BWP for communication between the first apparatus and the base station.

In step S1620, the base station may transmit, to the first apparatus, information related to a second BWP for sidelink communication between the first apparatus and the second apparatus.

For example, a numerology of the first BWP and a numerology of the second BWP may be the same. For example, a numerology may include at least one of subcarrier spacing and cyclic prefix (CP). For example, the subcarrier spacing may include at least one of 15 kHz, 30 kHz, 60 kHz, 120 kHz, or 240 kHz. For example, the CP may be one of a normal cyclic prefix (CP) or an extended cyclic prefix (CP).

For example, a center frequency of the first BWP and a center frequency of the second BWP may be the same. For example, the first BWP may be included in the second BWP. For example, the first BWP and the second BWP may be the same.

For example, the first apparatus may perform uplink transmission to the base station through the first BWP. For example, the first apparatus may perform sidelink transmission to the second apparatus through the second BWP.

Various embodiments of the present disclosure may be independently implemented. Alternatively, various embodiments of the present disclosure may be implemented by being combined or integrated. For example, for simplicity, various embodiments of the present disclosure have been described based on a 3GPP system. However, the various embodiments of the present disclosure may also be extended to other systems apart from the 3GPP system. For example, various embodiments of the present disclosure shall not be limited only to D2D direct communication and may also be used in uplink and downlink. At this point, a base station or relay node, and so on, may use the proposed method according to the various embodiments of the present disclosure. For example, information on whether or not the method according to the various embodiments of the present disclosure is being applied may be defined to be notified by a base station to a user equipment (UE), or by a transmitting UE to a receiving UE, via pre-defined signal (e.g., physical layer signal or higher layer signal). For example, information on rules according to the various embodiments of the present disclosure may be defined to be notified by a base station to a user equipment (UE), or by a transmitting UE to a receiving UE, via pre-defined signal (e.g., physical layer signal or higher layer signal). For example, among the various embodiments of the present disclosure, part of the embodiments may be limitedly applied only to Resource Allocation Mode 1. For example, among the various embodiments of the present disclosure, part of the embodiments may be limitedly applied only to Resource Allocation Mode 2.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
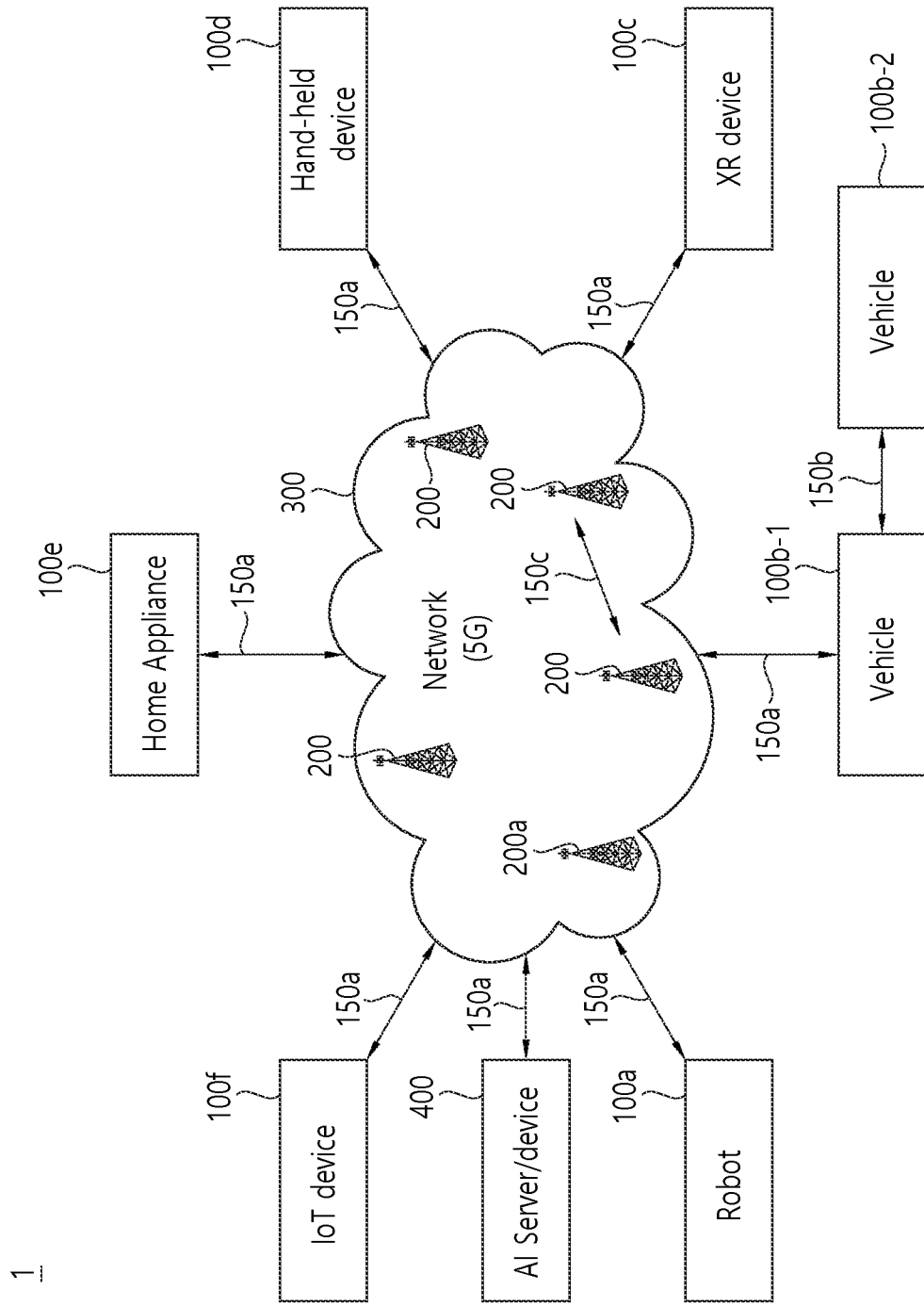
FIG. 17 shows a communication system (1), in accordance with an embodiment of the present disclosure.

FIG. 17 shows a communication system (1), in accordance with an embodiment of the present disclosure.

Referring to FIG. 17, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (150c) (e.g., relay, Integrated Access Backhaul (IAB)). The wireless devices and the BSs/the wireless devices may transmit/receive radio signals to/from each other through the wireless communication/connections (150a, 150b, 150c). For example, the wireless communication/connections (150a, 150b, 150c) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
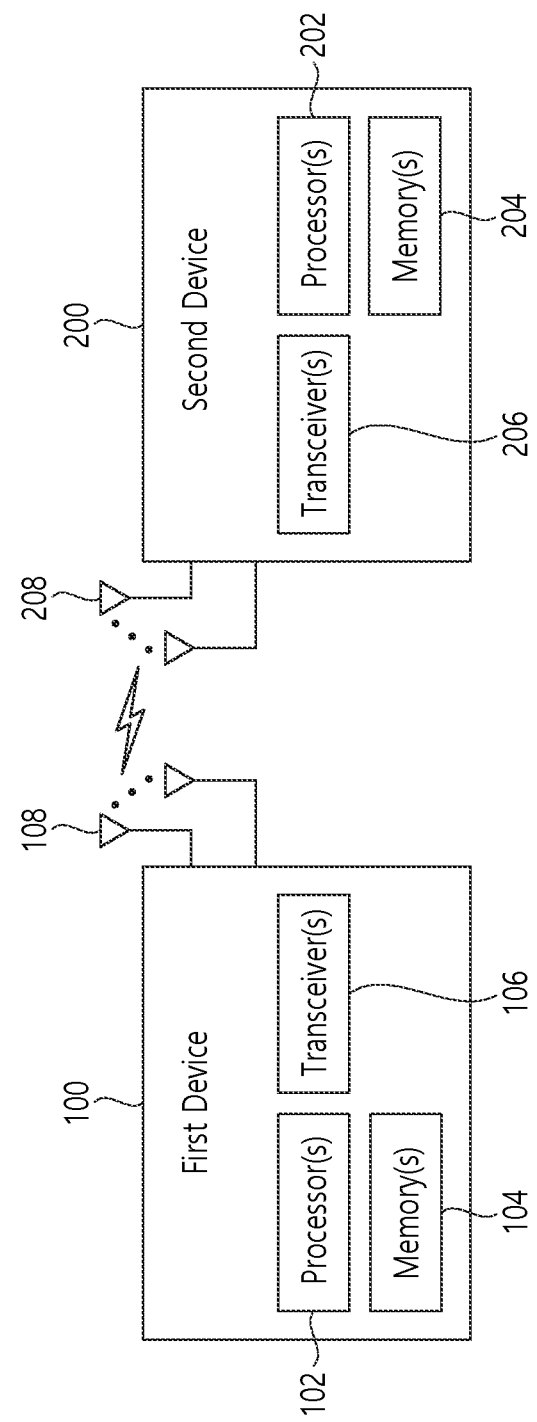
FIG. 18 shows wireless devices, in accordance with an embodiment of the present disclosure.

FIG. 18 shows wireless devices, in accordance with an embodiment of the present disclosure.

Referring to FIG. 18, a first wireless device (100) and a second wireless device (200) may transmit radio signals through a variety of RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 17.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s)

(102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s)(102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202)

may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 19:
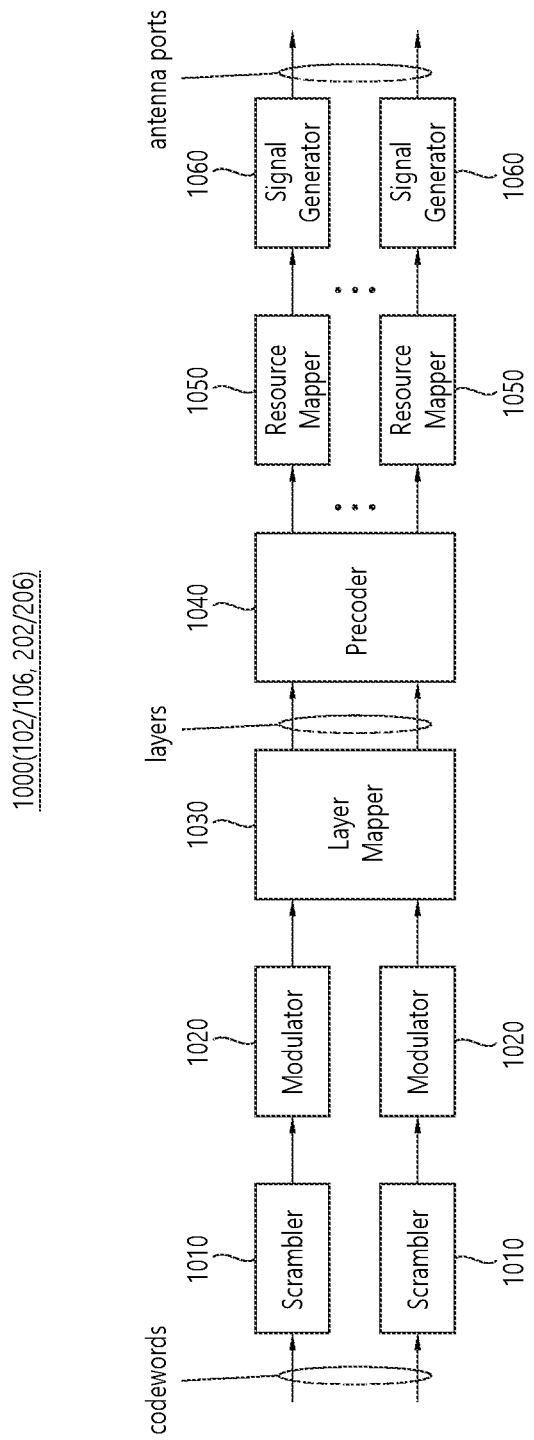
FIG. 19 shows a signal process circuit for a transmission signal, in accordance with an embodiment of the present disclosure.

FIG. 19 shows a signal process circuit for a transmission signal, in accordance with an embodiment of the present disclosure.

Referring to FIG. 19, a signal processing circuit (1000) may include scramblers (1010), modulators (1020), a layer mapper (1030), a precoder (1040), resource mappers (1050), and signal generators (1060). An operation/function of FIG. 19 may be performed, without being limited to, the processors (102, 202) and/or the transceivers (106, 206) of FIG. 18. Hardware elements of FIG. 19 may be implemented by the processors (102, 202) and/or the transceivers (106, 206) of FIG. 18. For example, blocks 1010~1060 may be implemented by the processors (102, 202) of FIG. 18. Alternatively, the blocks 1010~1050 may be implemented by the processors (102, 202) of FIG. 18 and the block 1060 may be implemented by the transceivers (106, 206) of FIG. 18.

Codewords may be converted into radio signals via the signal processing circuit (1000) of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 19. For example, the wireless devices (e.g., 100, 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
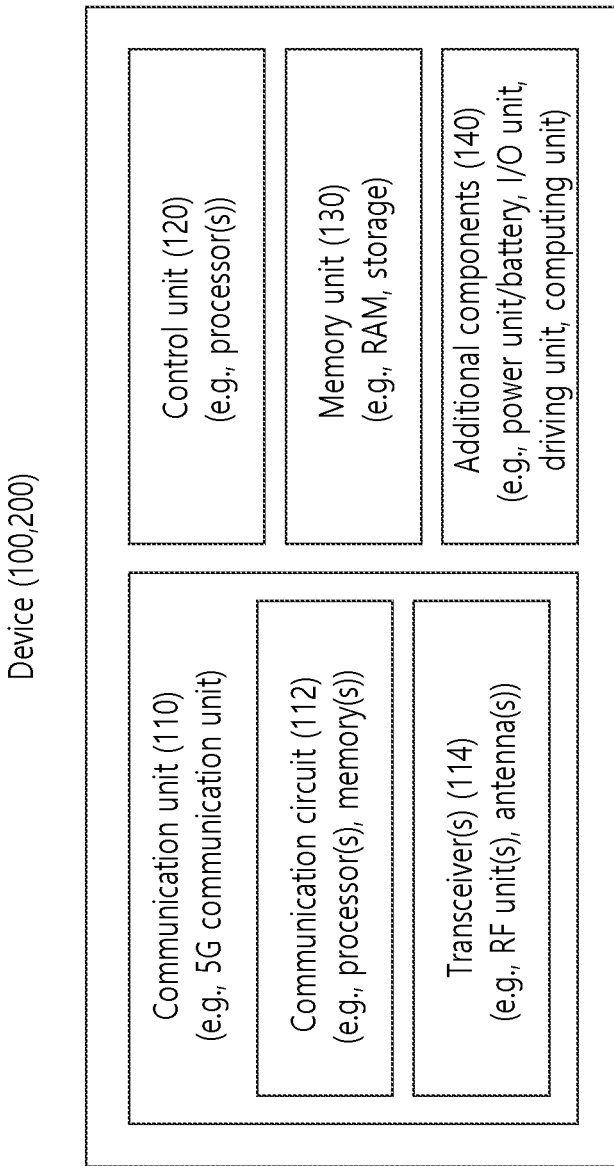
FIG. 20 shows another example of a wireless device, in accordance with an embodiment of the present disclosure.

FIG. 20 shows another example of a wireless device, in accordance with an embodiment of the present disclosure. The wireless device may be implemented in various forms according to a use-case/service (refer to FIG. 17).

Referring to FIG. 20, wireless devices (100, 200) may correspond to the wireless devices (100, 200) of FIG. 18 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 18. For example, the transceiver(s) (114) may include the one or more transceivers (106, 206) and/or the one or more antennas (108, 208) of FIG. 18. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 17), the vehicles (100b-1, 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, and so on. The wireless device may be used in a mobile or fixed place according to a use-example/service.

In FIG. 20, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
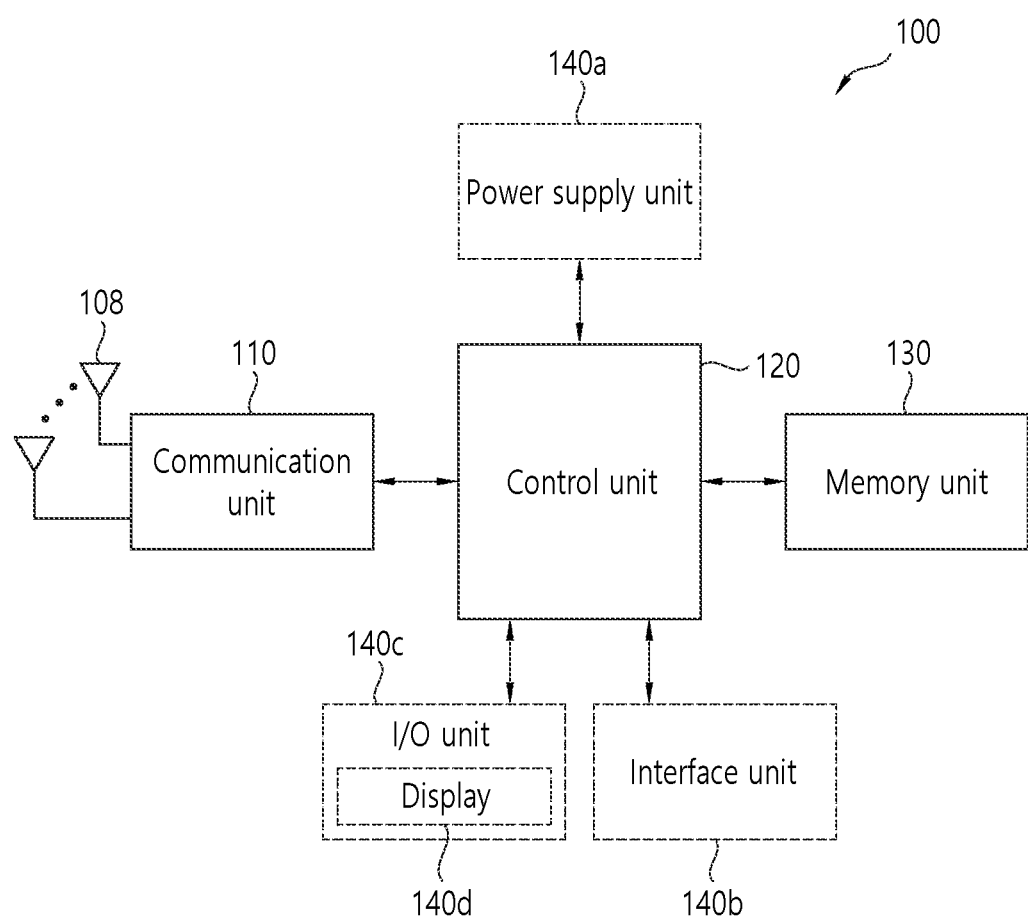
FIG. 21 shows a hand-held device, in accordance with an embodiment of the present disclosure.

FIG. 21 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 20, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 22:
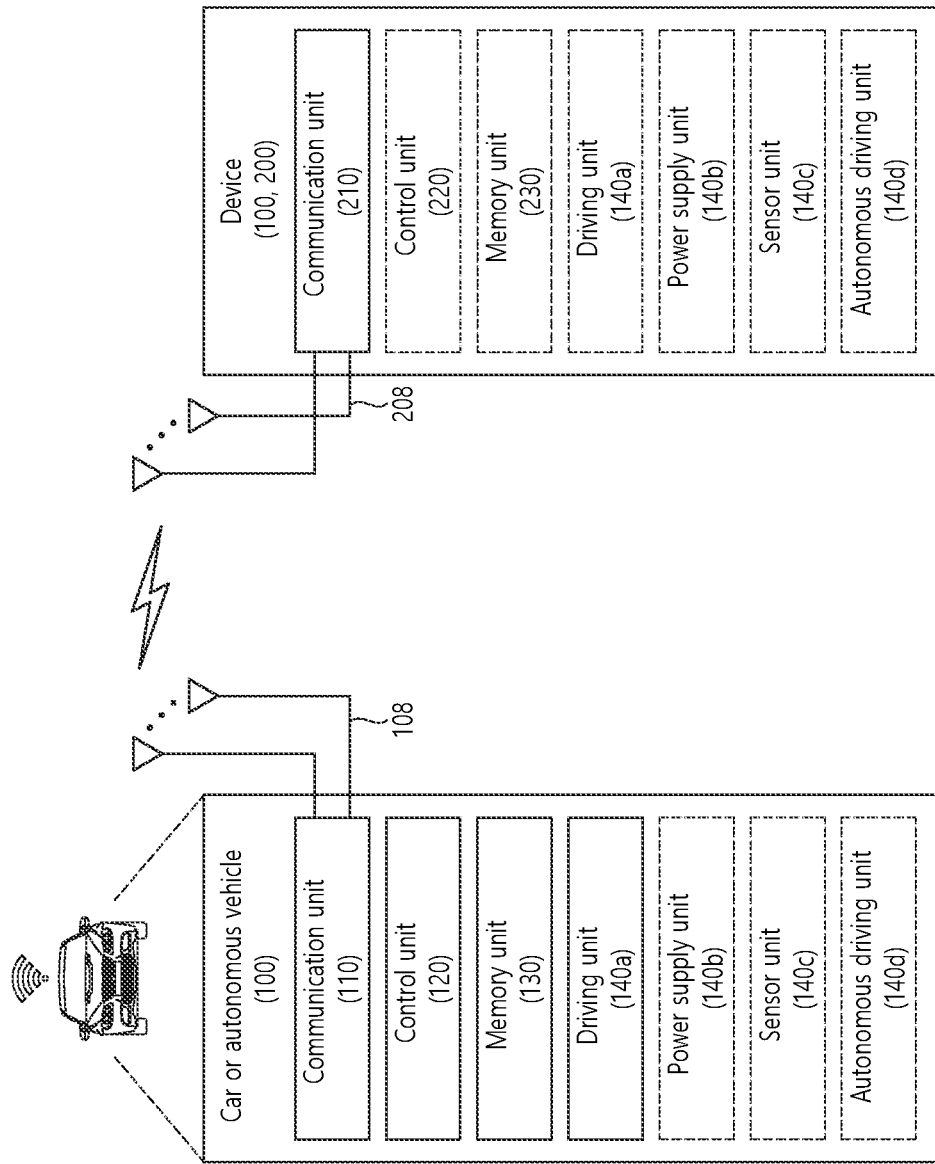
FIG. 22 shows a vehicle or an autonomous vehicle, in accordance with an embodiment of the present disclosure.

FIG. 22 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, and so on.

Referring to FIG. 22, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 20, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 23:
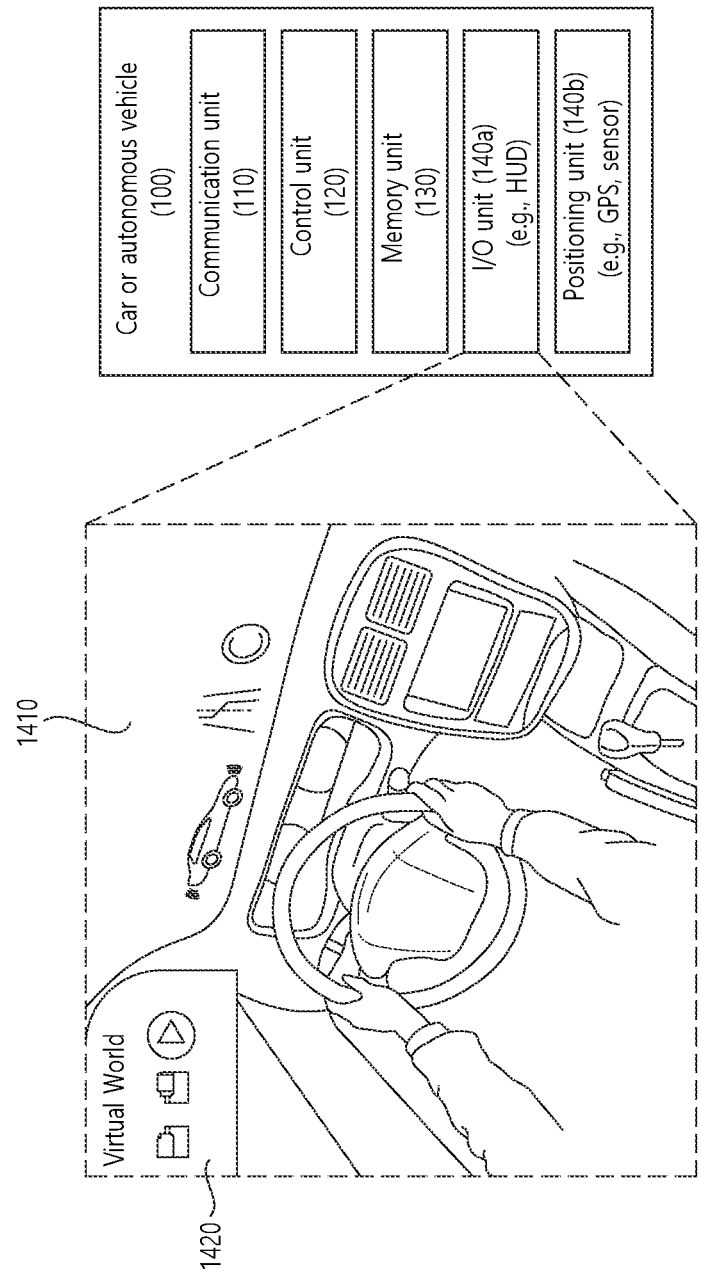
FIG. 23 shows a vehicle, in accordance with an embodiment of the present disclosure.

FIG. 23 shows a vehicle, in accordance with an embodiment of the present disclosure. The vehicle may be implemented as a transport means, an aerial vehicle, a ship, and so on.

Referring to FIG. 23, a vehicle (100) may include a communication unit (110), a control unit (120), a memory unit (130), an I/O unit (140a), and a positioning unit (140b). Herein, the blocks 110~130/140a~140b correspond to blocks 110~130/140 of FIG. 20.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include an HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

Figure 24:
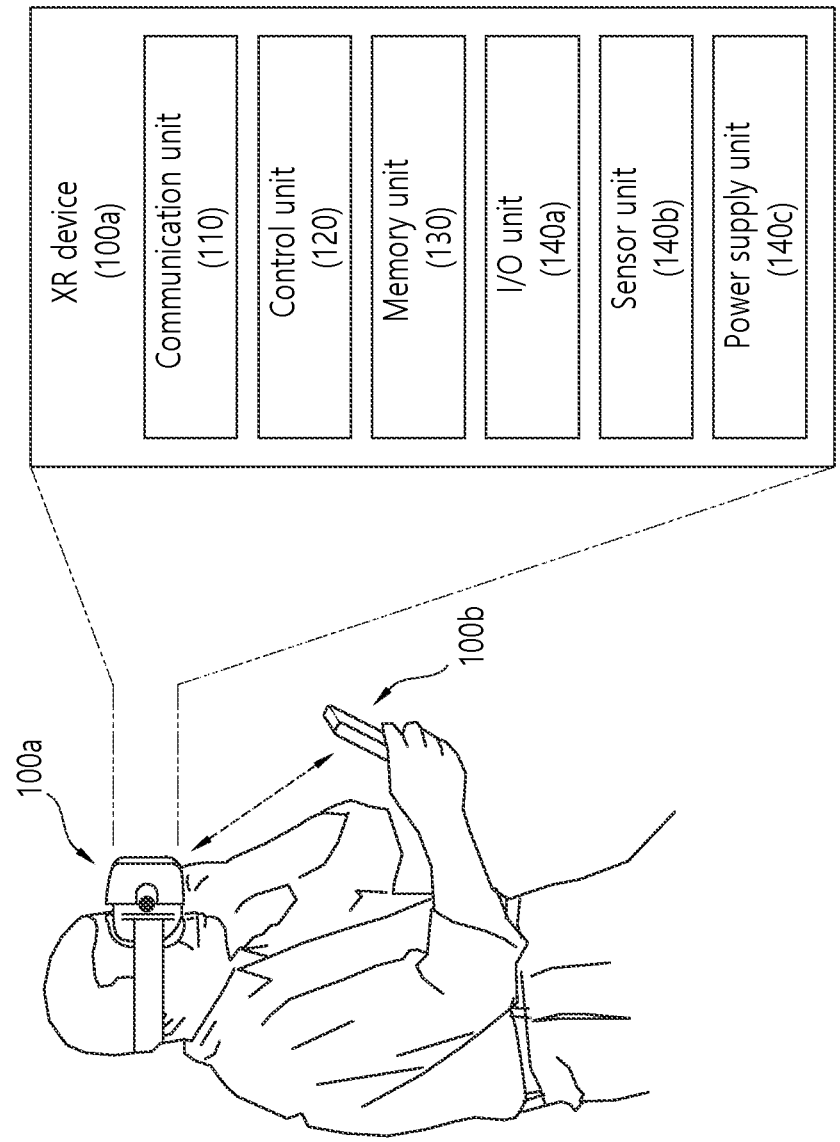
FIG. 24 shows an XR device, in accordance with an embodiment of the present disclosure.

FIG. 24 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 24, an XR device (100a) may include a communication unit (110), a control unit (120), a memory unit (130), an I/O unit (140a), a sensor unit (140b), and a power supply unit (140c). Herein, the blocks 110~130/140a~140c correspond to the blocks 110~130/140 of FIG. 20, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, and so on. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, and so on.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device 100b) or a media server through the communication unit (130). The communication unit (130) may download/stream content such as films or news from another device (e.g., the hand-held device 100b) or the media server to the memory unit (130). The control unit (120) may control and/or perform procedures such as video/mage acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 25:
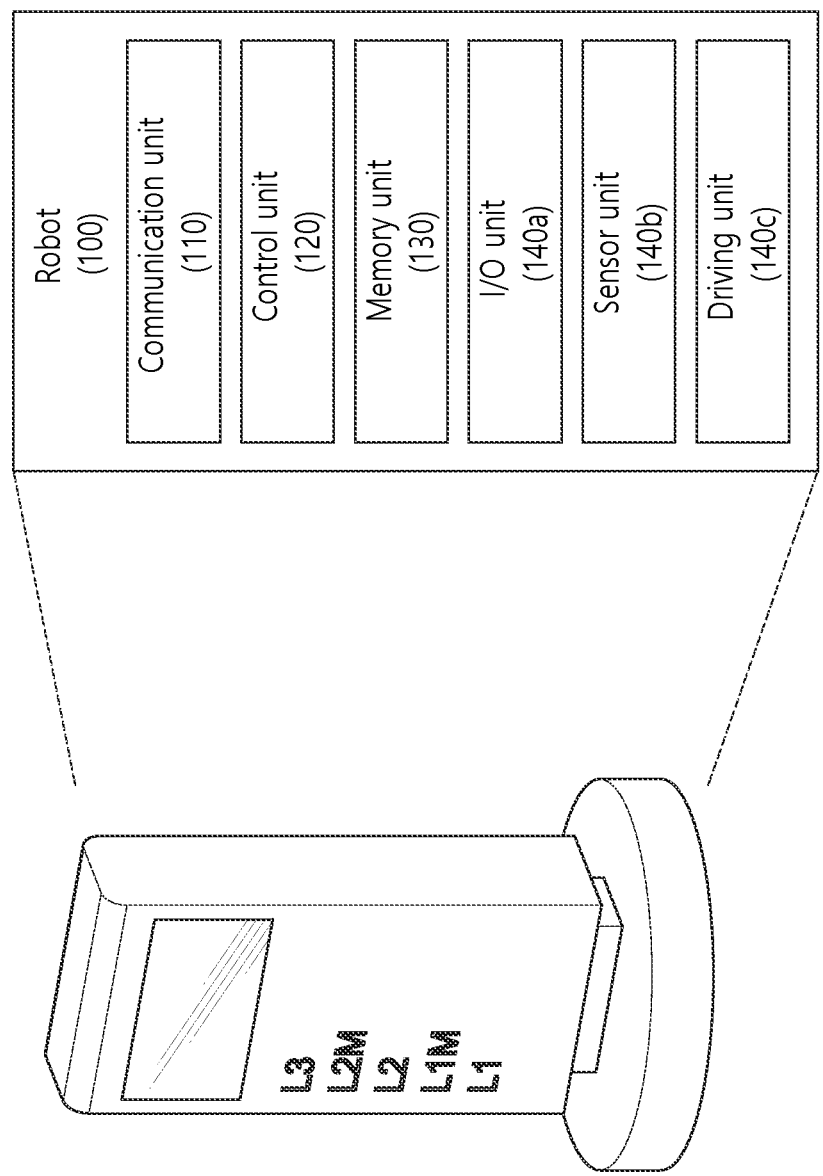
FIG. 25 shows a robot, in accordance with an embodiment of the present disclosure.

FIG. 25 shows a robot, in accordance with an embodiment of the present disclosure. The robot may be categorized into an industrial robot, a medical robot, a household robot, a military robot, and so on, according to a used purpose or field.

Referring to FIG. 25, a robot (100) may include a communication unit (110), a control unit (120), a memory unit (130), an I/O unit (140a), a sensor unit (140b), and a driving unit (140c). Herein, the blocks 110~130/140a~140c correspond to the blocks 110~130/140 of FIG. 20, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, and so on. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, and so on.

Figure 26:
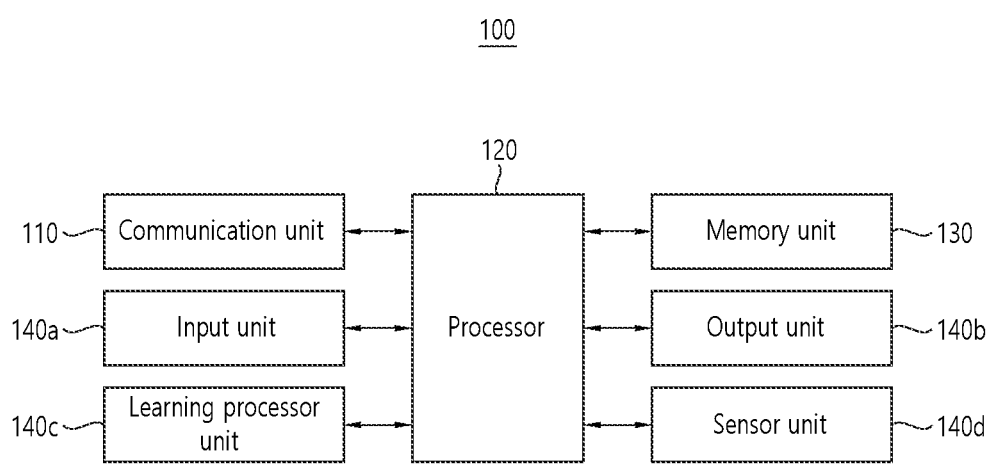
FIG. 26 shows an AI device, in accordance with an embodiment of the present disclosure.

FIG. 26 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 26, an AI device (100) may include a communication unit (110), a control unit (120), a memory unit (130), an I/O unit (140a/140b), a learning processor unit (140c), and a sensor unit (140d). The blocks 110~130/140a~140d correspond to blocks 110~130/140 of FIG. 20, respectively.

The communication unit (110) may transmit and receive wired/radio signals (e.g., sensor information, user input, learning models, or control signals) to and from external devices such as other AI devices (e.g., 100x, 200, 400 of FIG. 17) or an AI server (e.g., 400 of FIG. 17) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 17). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit 140 may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 17). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a first device in a wireless communication system, the method comprising:
obtaining first configuration information related to a universal mobile telecommunications system (UMTS) user (Uu) bandwidth part (BWP) related to communication between the first device and a base station;

obtaining second configuration information related to a sidelink (SL) BWP related to SL communication between the first device and a second device;

transmitting, to the base station, information related to a BWP switching between the Uu BWP and the SL BWP, wherein the BWP switching is either that the SL BWP is switched to the Uu BWP or that the Uu BWP is switched to the SL BWP;

receiving, from the base station, information related to a time period in which the BWP switching is allowed; and performing the BWP switching within the time period in which the BWP switching is allowed, wherein the information related to the time period in which the BWP switching is allowed is determined based on the information related to the BWP switching.

2. The method of claim 1,
wherein, based on that a BWP of the first device is the SL BWP, the BWP switching is that the SL BWP is switched to the Uu BWP.

3. The method of claim 1,
wherein, based on that a BWP of the first device is the Uu BWP, the BWP switching is that the Uu BWP is switched to the SL BWP.

4. The method of claim 1,
wherein, based on the information related to the BWP switching, the information related to the time period in which the BWP switching is allowed is determined by the base station.

5. The method of claim 1,
wherein, based on the SL BWP, the information related to the BWP switching includes information related to a time period in which the SL communication is needed to be performed by the first device.

6. The method of claim 1,
wherein the information related to the BWP switching includes information related to a priority of an SL service to be transmitted by the first device.

7. The method of claim 1,
wherein the information related to the BWP switching includes information related to a time required for the first device to perform the BWP switching.

8. The method of claim 1,
wherein the information related to the BWP switching includes information related to whether or not the BWP switching is required.

9. The method of claim 8,
wherein whether or not the BWP switching is required is determined based on a type of service to be transmitted by the first device.

10. The method of claim 1,
wherein the information related to the BWP switching includes information related to a resource for SL transmission to be used by the first device.

11. The method of claim 1,
wherein the information related to the time period in which the BWP switching is allowed is a bitmap.

12. The method of claim 2,
wherein the communication on the Uu BWP with the base station is performed by the first device, wherein the SL communication on the SL BWP is stopped by the first device.

13. The method of claim 3,
wherein the SL communication on the SL BWP with the second device is performed by the first device, and
wherein the communication on the Uu BWP with the base station is stopped by the first device.

14. A first device configured to perform wireless communication, the first device comprising:
at least one transceiver;
at least one processor; and
at least one memory connected to the at least one processor and storing instructions that, based on being executed, cause the at least one processor to perform operations comprising:

obtaining first configuration information related to a universal mobile telecommunications system (UMTS) user (Uu) bandwidth part (BWP) related to communication between the first device and a base station;

obtaining second configuration information related to a sidelink (SL) BWP related to SL communication between the first device and a second device;

transmitting, to the base station, information related to a BWP switching between the Uu BWP and the SL BWP, wherein the BWP switching is either that the SL BWP is switched to the Uu BWP or that the Uu BWP is switched to the SL BWP;

receiving, from the base station, information related to a time period in which the BWP switching is allowed; and performing the BWP switching within the time period in which the BWP switching is allowed, wherein the information related to the time period in which the BWP switching is allowed is determined based on the information related to the BWP switching.

15. The first device of claim 14,
wherein, based on that a BWP of the first device is the SL BWP, the BWP switching is that the SL BWP is switched to the Uu BWP.

16. The first device of claim 14,
wherein, based on that a BWP of the first device is the Uu BWP, the BWP switching is that the Uu BWP is switched to the SL BWP.

17. The first device of claim 14,
wherein, based on the information related to the BWP switching, the information related to the time period in which the BWP switching is allowed is determined by the base station.

18. The first device of claim 14,
wherein, based on the SL BWP, the information related to the BWP switching includes information related to a time period in which the SL communication is needed to be performed by the first device.

19. The first device of claim 14,
wherein the information related to the BWP switching includes information related to a priority of an SL service to be transmitted by the first device.

* * * * *